(12) United States Patent
Kawashima et al.

(10) Patent No.: US 11,806,614 B2
(45) Date of Patent: Nov. 7, 2023

(54) MANIPULATION INPUT DEVICE

(71) Applicant: Sony Interactive Entertainment Inc., Tokyo (JP)

(72) Inventors: Kenji Kawashima, Tokyo (JP); Ryo Fukikoshi, Saitama (JP); Masaho Morita, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/895,145

(22) Filed: Aug. 25, 2022

(65) Prior Publication Data

US 2022/0401828 A1    Dec. 22, 2022

Related U.S. Application Data

(63) Continuation of application No. 16/960,212, filed as application No. PCT/JP2019/001498 on Jan. 18, 2019, now Pat. No. 11,439,897.

(30) Foreign Application Priority Data

Jan. 19, 2018    (JP) .................................. 2018-007635

(51) Int. Cl.
    *A63F 13/24*    (2014.01)
(52) U.S. Cl.
    CPC .................................... *A63F 13/24* (2014.09)
(58) Field of Classification Search
    None
    See application file for complete search history.

(56) References Cited

U.S. PATENT DOCUMENTS

| | | |
|---|---|---|
| 2001/0021668 A1 | 9/2001 | Takeda |
| 2007/0146317 A1 | 6/2007 | Schena |
| 2013/0147610 A1 | 6/2013 | Grant |
| 2016/0008711 A1 | 1/2016 | Hackney |

(Continued)

FOREIGN PATENT DOCUMENTS

| | | |
|---|---|---|
| CN | 1153576 A | 7/1997 |
| CN | 1444758 A | 9/2003 |

(Continued)

OTHER PUBLICATIONS

International Search Report for corresponding PCT Application No. PCT/JP2019/001498, 2 pages, dated Apr. 16, 2019.

(Continued)

*Primary Examiner* — Peter J Iannuzzi
(74) *Attorney, Agent, or Firm* — Matthew B. Dernier, Esq.

(57) ABSTRACT

A manipulation input device includes: a manipulation button having a support rotatable about a rotation center line when a side of the manipulation button is pushed by a user in a push direction, and having a contact portion on an opposite side to the side pushed by the user; an actuator having a support rotatable about the rotation center line, and having a post that engages the contact portion and applies a force to the manipulation button in an opposite direction to the push direction; and a rack disposed on the actuator, which includes teeth located along an arc at a radial distance from the center line, where the teeth and engaged by and receive controlled drive from a rotating drive gear, thereby controlling the rotation of the actuator about the rotation center line.

9 Claims, 14 Drawing Sheets

(56) References Cited

U.S. PATENT DOCUMENTS

| | | |
|---|---|---|
| 2016/0346680 A1 | 12/2016 | Tsai |
| 2016/0361639 A1 | 12/2016 | Schmitz |
| 2017/0354870 A1 | 12/2017 | Okamura |
| 2018/0018020 A1 | 1/2018 | Grant |
| 2018/0250587 A1* | 9/2018 | Strahle .................. A63F 13/25 |
| 2018/0345135 A1* | 12/2018 | Schmitz ................ G06F 3/0338 |
| 2019/0038968 A1 | 2/2019 | Machida |

FOREIGN PATENT DOCUMENTS

| | | |
|---|---|---|
| CN | 102974099 A | 3/2013 |
| JP | 2007103380 A | 4/2007 |
| JP | 2007296247 A | 11/2007 |
| JP | 2008173186 A | 7/2008 |
| JP | 2014061225 A | 4/2014 |
| JP | 2015197872 A | 11/2015 |
| JP | 2016051319 A | 4/2016 |
| JP | 2017221631 A | 12/2017 |
| WO | 2017150128 A1 | 9/2017 |
| WO | 2018222421 A1 | 12/2018 |

OTHER PUBLICATIONS

International Preliminary Report on Patentability and Written Opinion for corresponding PCT Application No. PCT/JP2019/001498, 11 pages, dated Jul. 30, 2020.

The Second Office Action for corresponding CN application No. 201980008034.6, 18 pages, dated Dec. 30, 2021.

European Search Report for corresponding EP Application No. 19740896, 12 pages, dated Oct. 14, 2021.

Office Action for corresponding U.S. Appl. No. 16/960,212, 10 pages, dated Jun. 11, 2021.

Notice of Reasons for Refusal for corresponding JP Patent Application No. 2021-038458, 7 pages, dated Oct. 7, 2022.

Decision to Grant a Patent for corresponding JP Application No. 2021-038458, 5 pages, dated Apr. 6, 2023.

* cited by examiner

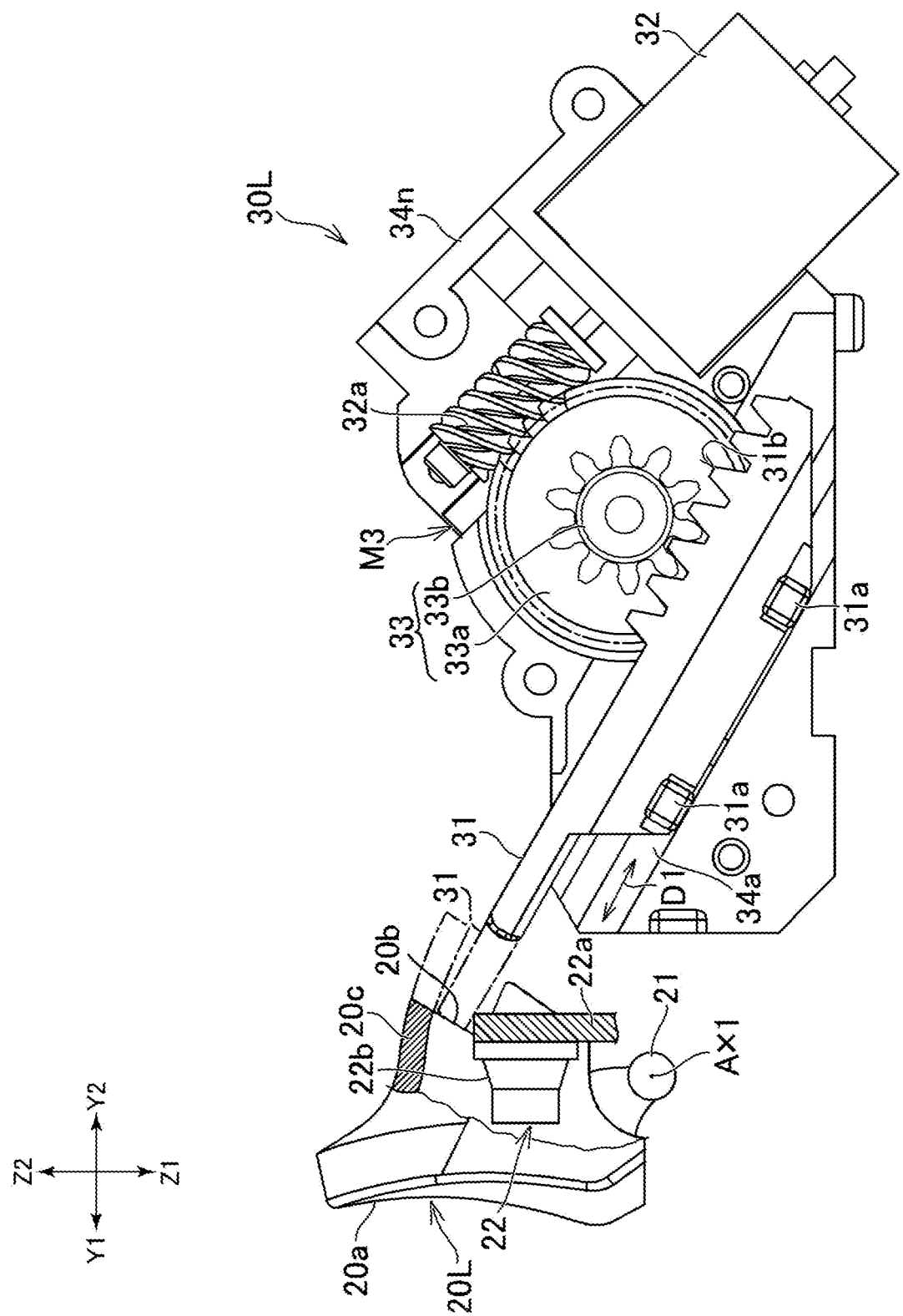

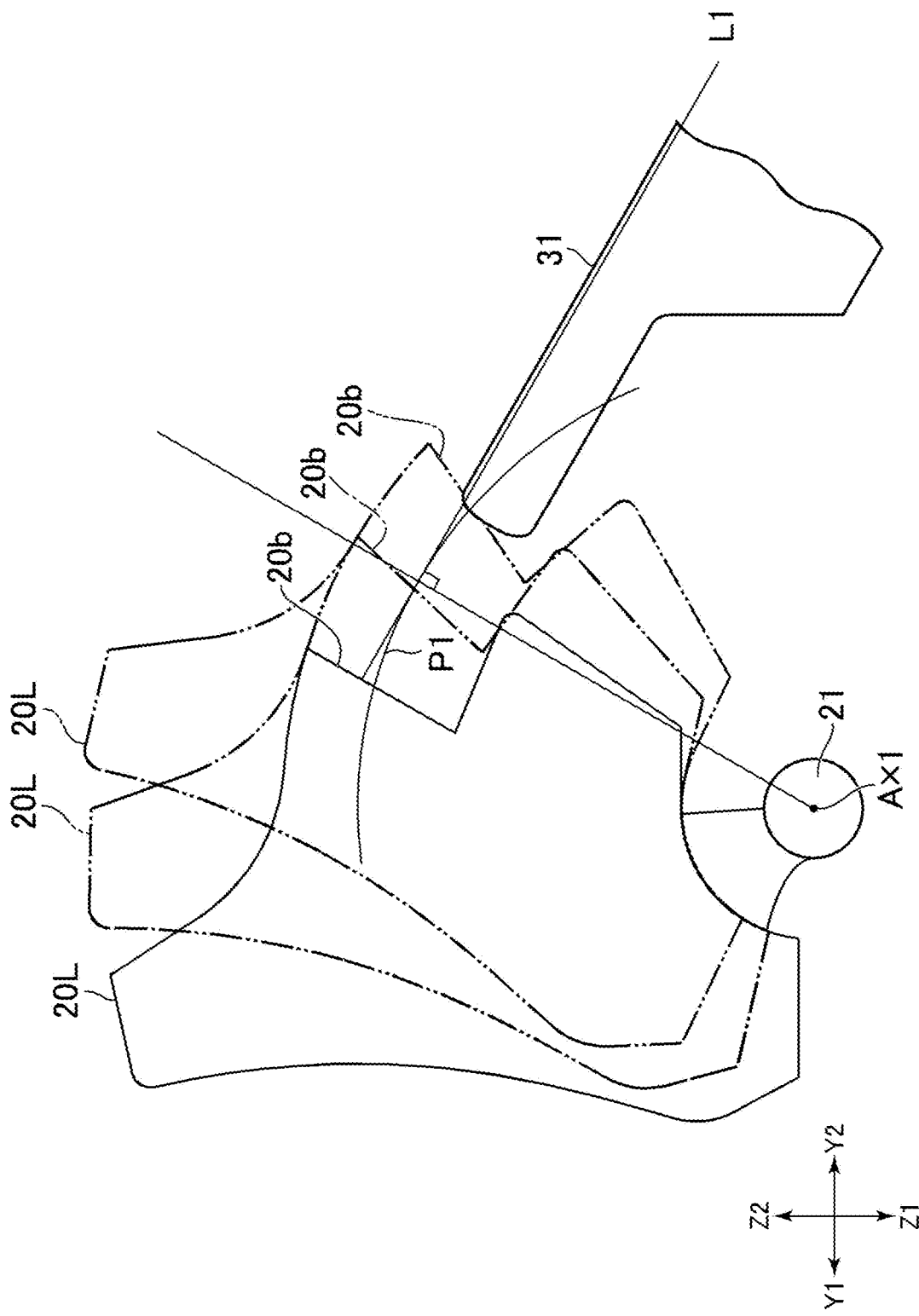

MANIPULATION INPUT DEVICE

CROSS REFERENCE TO RELATED APPLICATIONS

This is a continuation application of U.S. patent application Ser. No. 16/960,212, accorded a filing date of Jul. 6, 2020, allowed, which is a national stage application of International Application No. PCT/JP2019/001498, filed Jan. 18, 2019, which claims priority to JP Application No. 2018-007635, filed Jan. 19, 2018, the entire disclosures of which are hereby incorporated by reference.

TECHNICAL FIELD

The present invention relates to a manipulation input device having a function of providing the haptic sense to users.

BACKGROUND ART

PTL 1 described below discloses a manipulation input device having a function of providing the haptic sense to users. This input device has a manipulation button manipulated by a user and an actuator that moves the manipulation button. When the manipulation button is pushed, the actuator applies a reaction force to the manipulation button to provide the haptic sense to the user.

CITATION LIST

Patent Literature

[PTL 1] WO2017/150128

SUMMARY

Technical Problem

The actuator has a member that contacts a manipulation button and applies a reaction force to the manipulation button (hereinbelow, the member is referred to as button drive member). Depending on the direction of a relative movement of the button drive member relative to the manipulation button, the button drive member slides relative to an outer surface of the manipulation button when the button drive member moves along with the manipulation button. Such a sliding movement can cause wear of the outer surface of the manipulation button and an outer surface of the button drive member, and can be resistance to motions of the manipulation button and the button drive member.

One of objects of the present disclosure is to reduce sliding movements between a button drive member and a manipulation button in a manipulation input device having a function of providing the haptic sense.

Solution to Problem

One example of a manipulation input device according to the present disclosure includes: a manipulation button that is movable about a rotation center line by being pushed by a user, and has a contact portion on a side of the manipulation button opposite to a side to be pushed by the user; an actuator having a button drive member that contacts the contact portion of the manipulation button, and applies, to the manipulation button, a force in an opposite direction to a direction in which the manipulation button is pushed; and a guide that defines a direction in which the button drive member moves. In the manipulation input device, the button drive member is slidable along the guide. In this manipulation input device, the button drive member is slidable along the guide, and the direction in which the button drive member moves is defined by the guide. Accordingly, sliding movements between the button drive member and the contact portion of the manipulation button can be reduced.

Another example of a manipulation input device according to the present disclosure includes: a manipulation button that is movable about a rotation center line by being pushed by a user, and has a contact portion on a side of the manipulation button opposite to a side to be pushed by the user; and an actuator having a button drive member that contacts the contact portion of the manipulation button, and applies, to the manipulation button, a force in an opposite direction to a direction in which the manipulation button is pushed. The contact portion moves along an arc-like trajectory centered on the rotation center line, and the button drive member is movable about a rotation center line positioned inside an arc including the trajectory. In this manipulation input device, the button drive member moves about the rotation center line positioned inside a circle including the trajectory of the contact portion. Accordingly, sliding movements between the button drive member and the contact portion of the manipulation button can be reduced.

BRIEF DESCRIPTION OF DRAWINGS

FIG. 5A is a figure illustrating the actuator as seen in the direction of the arrow V in FIG. 4. In this figure, the inside of the case of the actuator illustrated in FIG. 2 is illustrated.

FIG. 5B is an enlarged view of the manipulation button illustrated in FIG. 5A.

DESCRIPTION OF EMBODIMENTS

Hereinafter, examples of embodiments of the present disclosure are explained. In the present specification, a manipulation input device 100 used for manipulation of a game machine is explained as one example of embodiments (hereinbelow, manipulation input devices are referred to as simply input devices). Note that the present disclosure may be applied to input devices used for manipulation of information processing apparatuses different from game machines (e.g., input devices used for manipulation of simulation apparatuses, input devices used for manipulation of vehicles, etc.).

Figure 1A:
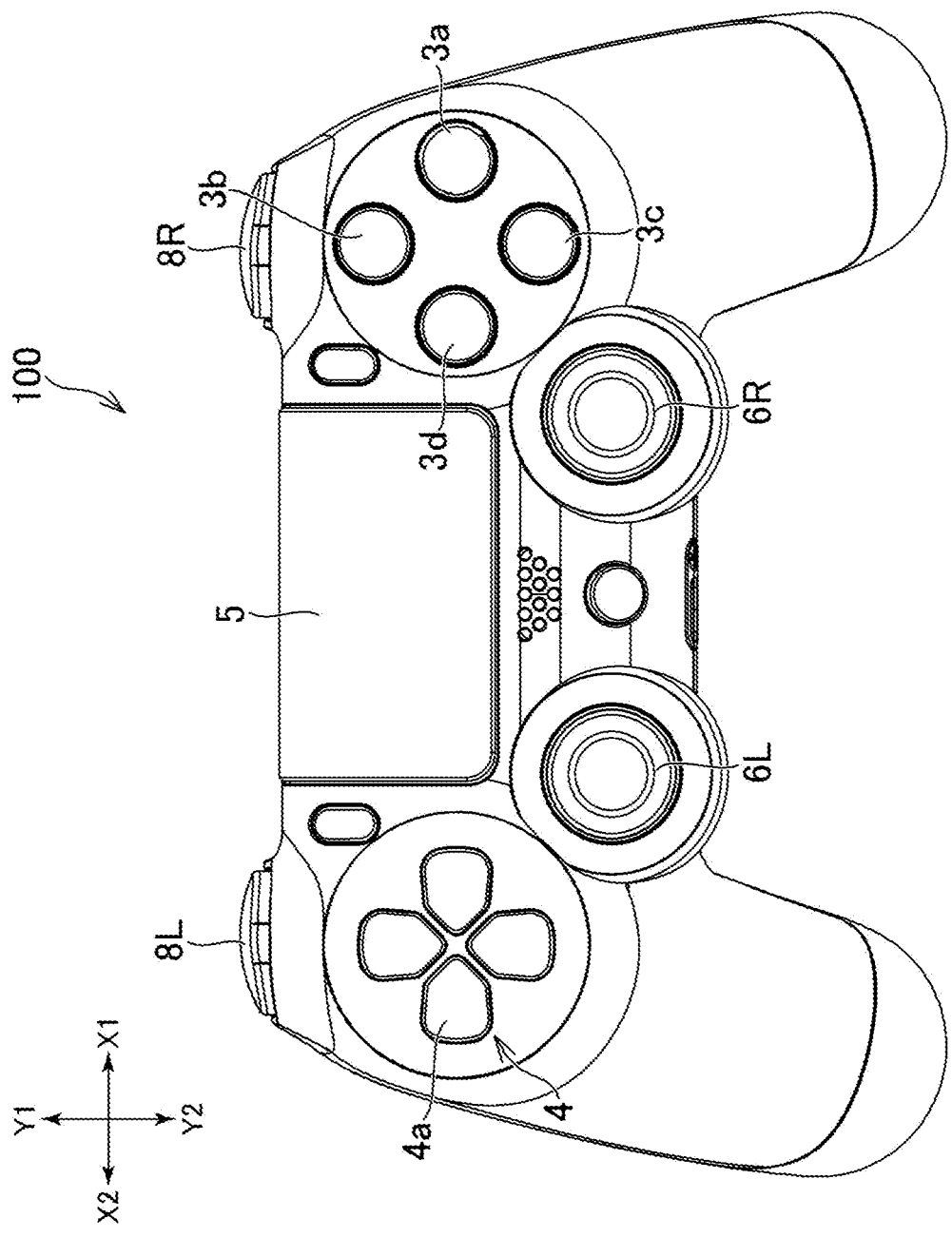
FIG. 1A is a plan view illustrating an example of a manipulation input device.
Figure 1B:
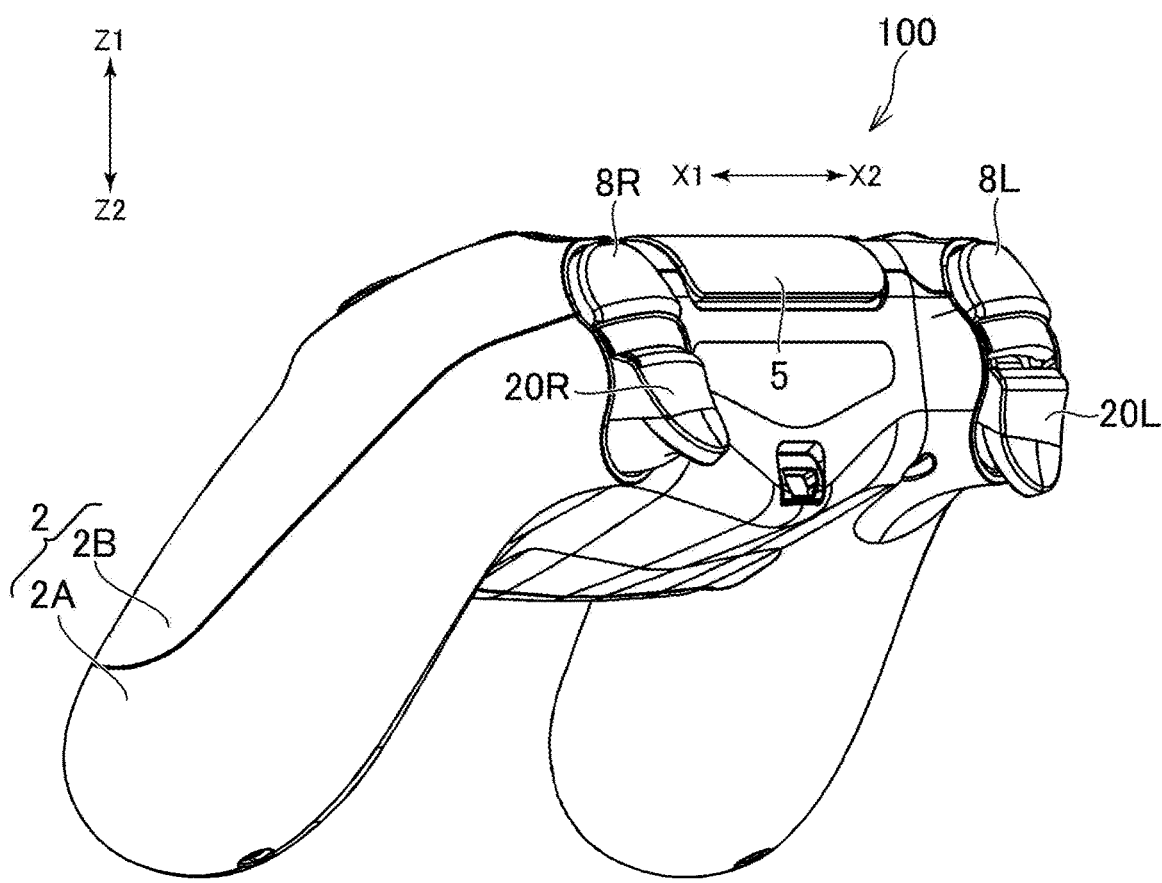
FIG. 1B is a perspective view illustrating the example of the manipulation input device.
Figure 2:
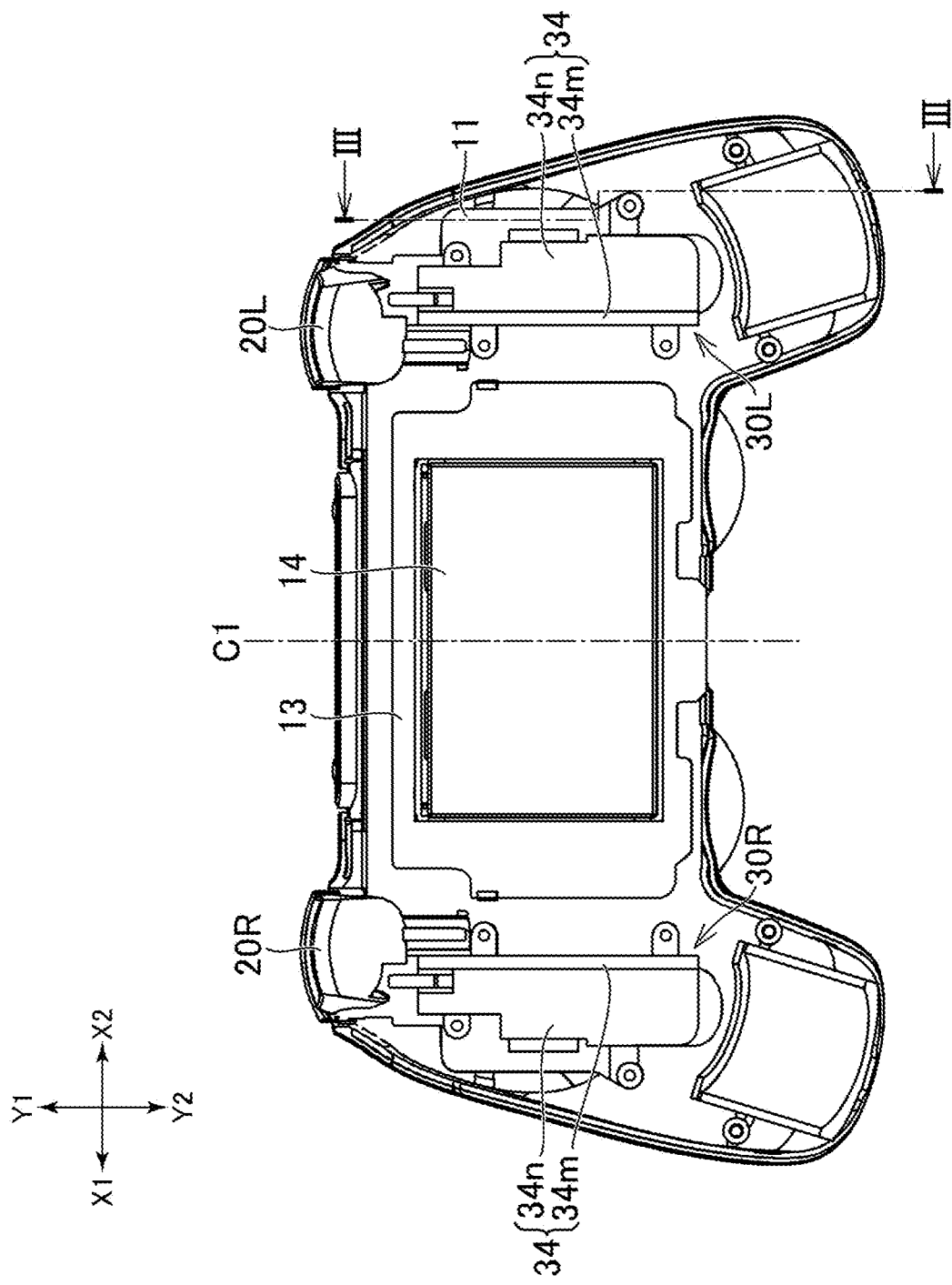
FIG. 2 is a bottom view illustrating a state where a lower cabinet of the manipulation input device is removed. In this figure, manipulation buttons, and actuators that move the manipulation buttons are illustrated.

In the following explanation, directions indicated by X1 and X2 illustrated in FIG. 1 are referred to as the rightward direction and the leftward direction, respectively, directions indicated by Y1 and Y2 in FIG. 1 are referred to as the forward direction and the backward direction, respectively, and directions indicated by Z1 and Z2 in FIG. 2 are referred to as the upward direction and the downward direction, respectively (the upper side in FIG. 3, FIG. 5A, FIG. 6, and FIG. 8 corresponds to the lower side of the input device 100). These directions are used for explaining relative positional relations among elements (parts, members, and portions) of the input device 100, and do not specify the posture of the input device 100 when the input device 100 is in use.

Note that in FIG. 3, FIG. 4, FIG. 5A, and FIG. 5B, a left manipulation button 20L, which is one of left and right manipulation buttons 20R and 20L mentioned below, and a left actuator 30L, which is one of left and right actuators 30R and 30L mentioned below, are illustrated. The structures of the left and right manipulation buttons 20R and 20L are symmetric about a center line C1 along the forward/backward direction, for example. In addition, the left and right actuators 30R and 30L may also be symmetric about the center line C1 along the forward/backward direction. Unlike the example of the input device 100, the left and right actuators 30R and 30L may not have symmetric structures. For example, the left and right actuators 30R and 30L may have the same structure. In a still another example, one of the actuators 30R and 30L may have the structure of an actuator according to any of modifications mentioned below illustrated in FIG. 6 to FIG. 8.

As illustrated in FIG. 1A, the input device 100 has a plurality of manipulation members on its upper surface. For example, four manipulation buttons 3a to 3d are provided at a right portion on the upper surface of the input device 100. In addition, a cross key 4 having four projecting portions 4a is provided at a left portion on the upper surface of the input device 100. In addition, a tabular manipulation pad 5 is provided between the manipulation buttons 3a to 3d and the cross key 4. The manipulation pad 5 has a touch sensor for sensing the position of a finger of a user touching the surface of the manipulation pad 5, for example. In addition, the manipulation pad 5 is configured such that the user can push the manipulation pad 5. Two joysticks 6R and 6L are provided behind the manipulation pad 5. The joysticks 6R and 6L can be tilted in the forward/backward direction, the leftward/rightward direction and directions oblique to the forward/backward direction and the leftward/rightward direction. In addition, the input device 100 has a grip portion GR extending backward from its right portion, and a left grip portion GL extending backward from its left portion.

When the input device 100 is in use, the user manipulates the manipulation members mentioned above while holding the grip portions GL and GR with his/her left and right hands, respectively. The input device 100 is a device that a user uses when he/she plays games, and transmits, to a game machine, signals corresponding to manipulation performed on the manipulation members mentioned above. The number and types of manipulation members, and the shape of the input device are not limited to those in the example illustrated in FIG. 1A. For example, the input device 100 may be configured such that a user holds with a single hand. In this case, the number of joysticks, and the number of grips may each be one. In addition, the input device 100 may not have the manipulation pad 5.

The input device 100 has a cabinet 2 constituting its exterior. The cabinet 2 has, for example, a lower cabinet 2A that constitutes a lower portion of the cabinet 2, and an upper cabinet 2B that constitutes an upper portion of the cabinet 2 and is combined with the lower cabinet 2A in the upward/downward direction. The manipulation members mentioned above such as the manipulation buttons 3a to 3d, the cross key 4 and the joysticks 6R and 6L protrude upward through openings formed through the upper cabinet 2B. The manipulation pad 5 is arranged inside an opening formed through the upper cabinet 2B.

[Manipulation Buttons] As illustrated in FIG. 1B, the input device 100 has a plurality of manipulation members also on its front surface. Specifically, a manipulation button 8R and the manipulation button 20R are provided at a right portion of the front surface, and a manipulation button 8L and the manipulation button 20L are provided at a left portion of the front surface. The manipulation buttons 20R and 20L are arranged below the manipulation buttons 8R and 8L, respectively. The manipulation buttons 20R and 20L are so-called trigger buttons, and are movable in the forward/backward direction about rotation center lines Ax1 (see FIG. 3 and FIG. 4) positioned at their upper portions.

Figure 3:
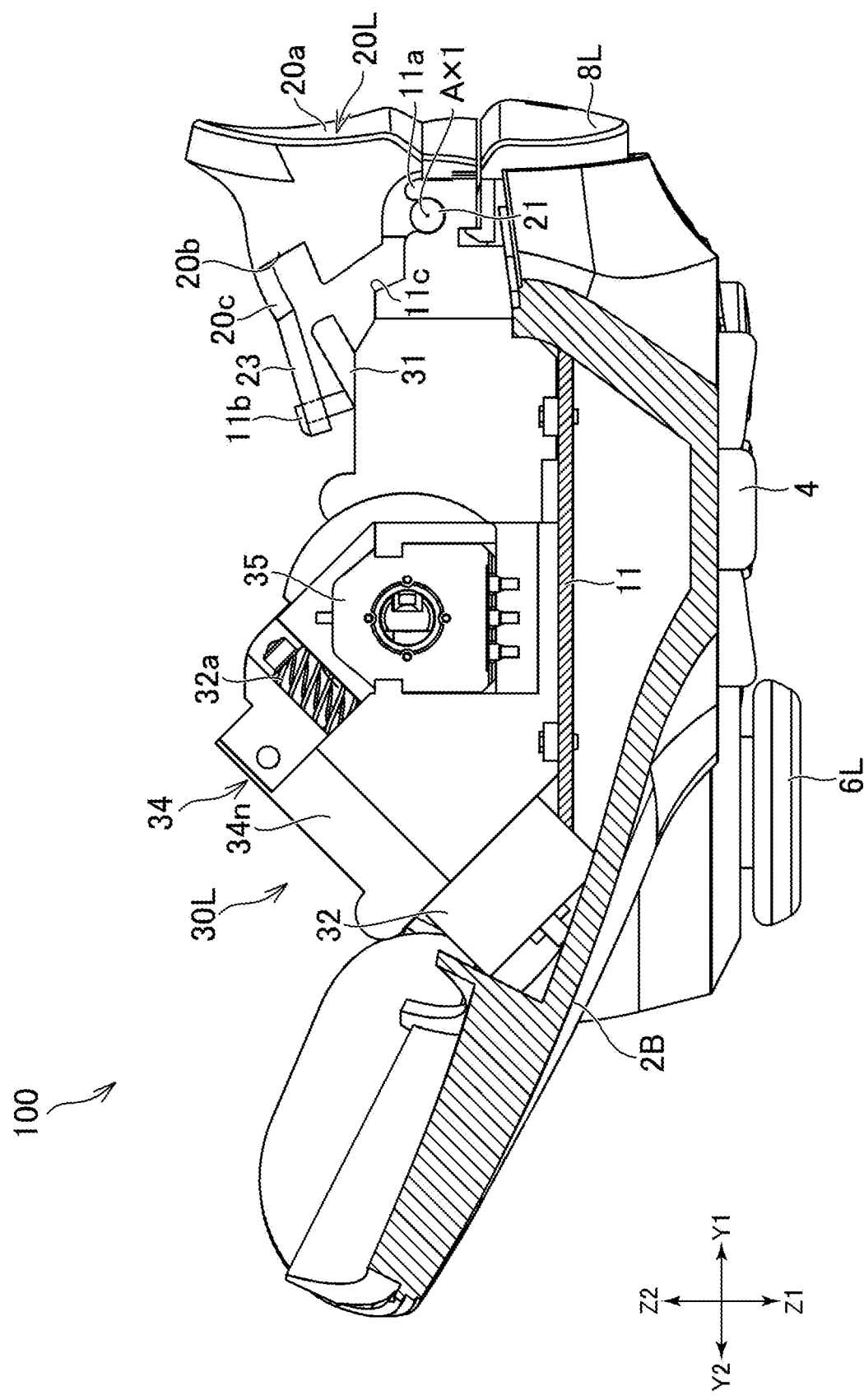
FIG. 3 is a cross-sectional view taken along the line III-III illustrated in FIG. 2. In this figure, a left manipulation button and a left actuator are illustrated.
Figure 4:
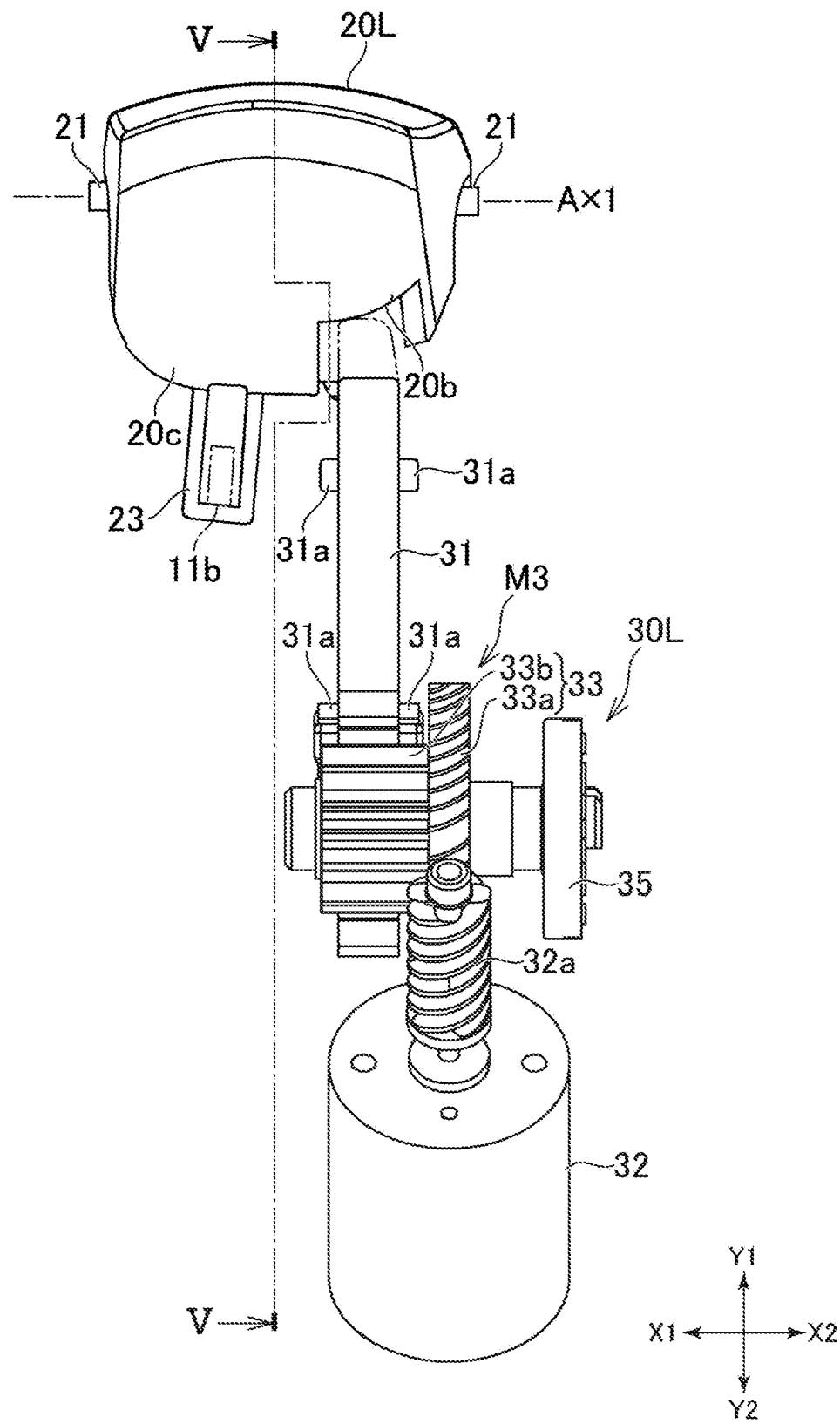
FIG. 4 is a bottom view of the manipulation button and the actuator. In this figure, a case of the actuator is removed, and its internal mechanism is illustrated.

In the example of the input device 100, the manipulation buttons 20R and 20L each have two supported portions 21 protruding from their right surface and left surface, respectively, and positioned at upper portions of the manipulation buttons 20R and 20L (see FIG. 4). The supported portions 21 are held rotatably, and function as the rotation center lines of the manipulation buttons 20R and 20L. In the example of the input device 100, a frame 11 is arranged inside the cabinet 2, and the supported portions 21 are held by holding portions 11a provided at frontmost portions of the frame 11 (see FIG. 3). When front surfaces 20a of the manipulation buttons 20R and 20L are pushed by the user, the manipulation buttons 20R and 20L move backward about the rotation center lines Ax1 passing through the supported portions 21.

The input device 100 has a stopper that regulates backward motions of the manipulation buttons 20R and 20L. As illustrated in FIG. 3, in the example of the input device 100, stoppers 11c are formed on the frame 11. The stoppers 11c define the maximally-pressed positions of the manipulation buttons 20R and 20L. That is, movements of the manipulation buttons 20R and 20L beyond the positions of the stoppers 11c are regulated.

The input device 100 has elastic members (e.g., springs) that push the manipulation buttons 20R and 20L forward. Accordingly, when the user moves his/her fingers away from the manipulation buttons 20R and 20L after pushing the manipulation buttons 20R and 20L, the manipulation buttons 20R and 20L move forward about the rotation center lines Ax1 due to forces of the elastic members, and return to their initial positions. In the example of the input device 100, the manipulation buttons 20R and 20L have engaging portions 23 (see FIG. 4) engaging with stoppers 11b (see FIG. 3) formed behind the manipulation buttons 20R and 20L. The stoppers 11b engage with the engaging portions 23, and prevent the manipulation buttons 20R and 20L from protruding forward due to the elastic forces of the elastic members.

The structures and arrangement of the manipulation buttons 20R and 20L are not limited to those in the example of the input device 100. For example, the manipulation buttons 20R and 20L may be provided on the lower surface or upper surface of the input device. In this case, the manipulation buttons 20R and 20L may move in the upward/downward direction about their rotation centers, or may move in directions oblique to both the upward/downward direction and the forward/backward direction. As a still another example, the manipulation buttons 20R and 20L may have holes or recessed portions as the supported portions 21. Then, projecting portions that fit to the supported portions 21, and support the manipulation buttons 20R and 20L may be formed on the cabinet 2 or the frame 11.

The number and types of manipulation buttons to be provided with the actuators 30R and 30L are not limited to those in the example of the input device 100. That is, in a case that the input device is a rod-like input device (e.g., a joystick), the number of manipulation buttons (trigger buttons) that move about rotation centers may be one. In this case, the number of actuators for providing the haptic sense that the input device has may be one.

As illustrated in FIG. 5A, a sensor 22 for sensing push manipulation of the manipulation buttons 20L and 20R by the user is arranged behind the manipulation button 20L (i.e., on the side opposite to the side to be pushed by the user). The sensor 22 is a sensor that can sense the pressed amount of the manipulation button 20L (the movement amount of the manipulation button 20L), for example. The sensor 22 has, for example, a sensor substrate 22a on which a resistor is formed, and a conductive rubber 22b that faces the resistor. When the manipulation button 20L is pushed by the user, the conductive rubber 22b is pushed by the manipulation button 20L. Then, the area of contact between the conductive rubber 22b and the resistor changes in accordance with the pressed amount, and the resistance value of the resistor changes accompanying changes of the area of contact. Accordingly, on the basis of the resistance value, more specifically on the basis of a voltage acting on the resistor, the pressed amount of the manipulation button 20L may be sensed. A sensor 22 is provided also behind the right manipulation button 20R. Note that the type of the sensors 22 is not limited to the one using the conductive rubbers 22b. Rotary encoders may be used as another example of the sensors 22. In this case, the sensors (rotary encoders) include coupling members, and may be coupled to the manipulation buttons 20L and 20R via the coupling members. Then, rotary motions of the manipulation buttons 20R and 20L may be transmitted to the encoders via the coupling members. As a still another example, instead of the sensors 22 for sensing push manipulation of the manipulation button 20R by the user, sensors that sense ON/OFF (ON/OFF switches) of manipulation of the manipulation button 20L may be arranged behind the manipulation buttons 20L and 20R.

[Actuators] As mentioned above, the input device 100 has the actuators 30R and 30L (see FIG. 2) for providing the haptic sense to the user. The actuators 30R and 30L are provided for the manipulation buttons 20R and 20L, respectively. In the example of the input device 100, the actuators 30R and 30L are arranged below the manipulation members arranged on the upper surface of the input device 100. Specifically, the actuator 30L is arranged below the cross key 4 arranged at the left portion on the upper surface of the input device 100, and the actuator 30R is arranged below the manipulation buttons 3a to 3d arranged at the right portion on the upper surface of the input device 100. The frame 11 (see FIG. 3) housed in the cabinet 2 is arranged below the cross key 4 and the manipulation buttons 3a to 3d, and the actuators 30R and 30L are arranged further below the frame 11. The frame 11 may support a substrate on which switches for sensing manipulation of the cross key 4 and the manipulation buttons 3a to 3d are formed. The actuators 30R and 30L are arranged separately in the leftward/rightward direction, and a circuit substrate 13 and a battery 14 are arranged between the actuators 30R and 30L.

Since the manipulation buttons 20R and 20L and the actuators 30R and 30L have the same structure or structures that are symmetric about the center line C1 as mentioned above, mainly the left manipulation button 20L and actuator 30L are explained with reference to FIG. 3 to FIG. 5B hereinbelow.

The manipulation button 20L has a contact portion 20b on a side thereof (rear side in the example of the input device 100) opposite to the side to be pushed by the user. The actuator 30L provides the haptic sense to the user by contacting the contact portion 20b, and applying, to the manipulation button 20L, a force in an opposite direction to a direction in which the user pushes the manipulation button 20L. The input device 100 drives the actuator 30L in accordance with a signal (instruction) received from a game machine, for example.

For example, when the user pushes the manipulation button 20L, the actuator 30L regulates the motion of the manipulation button 20L (i.e., the actuator 30L functions as a stopper for motions of the manipulation button 20L). Thereby, when a character manipulated by the user in a virtual space provided by the game machine touches a hard object, the user can feel the touch of a hard object. In another example, when the user pushes the manipulation button 20L, the actuator 30L may apply a reaction force corresponding to the movement amount (pressed amount) of the manipulation button 20L (a force in an opposite direction to a direction in which the user pushes the manipulation button 20L) to the manipulation button 20L. According to this, when a character manipulated by the user in a virtual space touches an elastic object, the user can feel the touch of an elastic object. In a still another example, when the user pushes the manipulation button 20L, the actuator 30L may vibrate the manipulation button 20L in the forward/backward direction.

As illustrated in FIG. 5A, the actuator 30L has an electric motor 32 which is a driving source of the actuator 30L. The electric motor 32 is a stepping motor, a servomotor or the like, for example. The electric motor 32 may be a geared motor having a built-in deceleration gear. A control device (a control device provided to the input device 100 or a game machine) that controls the actuator 30L performs torque control, position control and/or speed control of the electric motor 32.

[Button Drive Members] As illustrated in FIG. 5A, the actuator 30L has a button drive member 31 that contacts the contact portion 20b of the manipulation button 20L, and moves the manipulation button 20L. In addition, the actuator 30 has the electric motor 32 which is a driving source to move the button drive member 31, a transmission mechanism M3 that transmits motive power of the electric motor 32 to the button drive member 31, and a case 34 (see FIG.

2) holding the electric motor 32, the transmission mechanism M3 and the button drive member 31.

The button drive member 31 applies, to the manipulation button 20L, a force in an opposite direction to a direction in which the user pushes the manipulation button 20L, that is, a force in a direction to move the manipulation button 20L back to its initial position. When the manipulation button 20L is at its initial position, a gap may be provided between the button drive member 31 and the contact portion 20b of the manipulation button 20L, or the button drive member 31 and the contact portion 20b of the manipulation button 20L may be in contact with each other.

The contact portion 20b of the manipulation button 20L is formed at a position away from the rotation center line Ax1 of the manipulation button 20L. In the example of the input device 100, as illustrated in FIG. 4 and FIG. 5A, the contact portion 20b is formed at an edge (rear edge) of a lower-wall portion 20c of the manipulation button 20L. As mentioned above, the sensor 22 is arranged behind the manipulation button 20L. As illustrated in FIG. 5A, when the manipulation button 20L is seen in the direction of the rotation center line Ax1, the contact portion 20b is positioned opposite to the rotation center line Ax1, with the sensor 22 being sandwiched between the contact portion 20b and the rotation center line Ax1. With this arrangement, a sufficient distance can be surely left between the contact portion 20b and the rotation center line Ax1, and it is possible to make a force (i.e., a moment) that the button drive member 31 applies to the manipulation button 20L sufficiently large. As illustrated in FIG. 4, in the example of the input device 100, a recessed portion is formed at the rear edge of the lower-wall portion 20c of the manipulation button 20L, and this recessed portion functions as the contact portion 20b. The contact portion 20b may be a projecting portion projecting from the rear edge of the lower-wall portion 20c, or may be the rear edge itself of the lower-wall portion 20c. Note that as mentioned above, a rotary encoder may be used as the sensor 22. In this case, the contact portion 20b may be formed at a position farther away from Ax1 in the radial direction than the rotary encoder. In addition, in a structure in which the sensor includes a rotary encoder, and a coupling member that couples the rotary encoder and the manipulation button 20R or 20L, the contact portion 20b may be positioned opposite to the rotation center line Ax1, with the coupling member being sandwiched between the contact portion 20b and the rotation center line Ax1.

As illustrated in FIG. 5A, the actuator 30L has guides 34a that define the direction in which the button drive member 31 moves. The button drive member 31 is slidable along the guides 34a while staying in contact with the contact portion 20b of the manipulation button 20L. As mentioned above, the actuator 30L has the case 34 (see FIG. 2) holding the button drive member 31, the transmission mechanism M3 and the electric motor 32. In the example of the input device 100, the guides 34a are formed on the case 34. In this manner, by causing the button drive member 31 to slide along the guides 34a, sliding movements between the contact portion 20b of the manipulation button 20L and the tip of the button drive member 31 can be made small. As a result, it is possible to prevent wear of the contact portion 20b of the manipulation button 20L and the tip of the button drive member 31, and to realize smooth motions of the manipulation button 20L and the button drive member 31.

As illustrated in FIG. 5A, the guides 34a are formed such that the button drive member 31 slides linearly. In other words, the guides 34a are grooves extending linearly in the direction of the arrow D1. The guides 34a are formed such that the button drive member 31 slides in the same direction as a direction in which the contact portion 20b moves. Specifically, since the position of the contact portion 20b moves about the rotation center line Ax1 accompanying a motion of the manipulation button 20L, the contact portion 20b moves along an arc-like trajectory P1 centered on the rotation center line Ax1 as illustrated in FIG. 5B. (In FIG. 5B, the manipulation button 20L at its initial position is illustrated by solid lines, the manipulation button 20L at its maximally-pressed position is illustrated by two-dot chain lines, and the manipulation button 20L at the middle position between the initial position and the maximally-pressed position is illustrated by alternate long and short dash lines. In FIG. 5B, the trajectory of a point on the contact portion 20b at which the button drive member 31 touches the contact portion 20b is illustrated as the trajectory P1. The trajectory P1 has a length corresponding to the movable range of the contact portion 20b, but an arc which includes the trajectory P1 and is longer than the trajectory P1 is illustrated in FIG. 5B). The guides 34a are formed such that the button drive member 31 slides linearly in the direction along the tangent L1 of the trajectory P1. With such guides 34a and a button drive member 31, sliding movements between the contact portion 20b of the manipulation button 20L and the tip of the button drive member 31 can be made small.

As mentioned above, in FIG. 5B, the manipulation button 20L at the middle position between the initial position and the maximally-pressed position is illustrated by alternate long and short dash lines (here, the "middle position" is an equidistant position from the initial position and the maximally-pressed position). The sliding direction of the button drive member 31, in other words, the direction of extension of the guides 34a (the direction of the arrow D1) is the same as a direction in which the contact portion 20b moves along with the manipulation button 20L at the middle position. In other words, the sliding direction of the button drive member 31 is parallel to the tangent L1 at the middle position of the arc-like trajectory P1 of the contact portion 20b (the "middle position of the trajectory" is an equidistant position from both ends of the trajectory).

By defining the sliding direction of the button drive member 31 in the manner mentioned above, the sliding-movement range of the tip of the button drive member 31 and the contact portion 20b can be made small more effectively. That is, in the example of the input device 100, since the button drive member 31 moves linearly while the manipulation button 20L rotates about the rotation center line Ax1, sliding movements between the tip of the button drive member 31 and the contact portion 20b of the manipulation button 20L cannot be eliminated completely. However, since the sliding direction of the button drive member 31 is parallel to the tangent L1 at the middle position of the trajectory P1 of the contact portion 20b, the sliding-movement range can be made small as compared to that in a case that the sliding direction of the button drive member 31 is parallel to the tangent at an end portion of the trajectory P1, for example.

As illustrated in FIG. 5A and FIG. 5B, in the example of the input device 100, the contact portion 20b is positioned behind the rotation center line Ax1. Because of this, the contact portion 20b moves in a direction inclined to both the forward/backward direction and the upward/downward direction accompanying a motion of the manipulation button 20L. Accordingly, similarly to the contact portion 20b, the button drive member 31 is slidable in a direction inclined to both the forward/backward direction and the upward/downward direction.

The button drive member 31 has a movable range larger than the movable range of the manipulation button 20L. The maximally-pressed position of the manipulation button 20L is defined by the stopper 11*c* (FIG. 3) mentioned above. In a state where the manipulation button 20L is at its maximally-pressed position, the button drive member 31 is further slidable in the direction away from the contact portion 20*b*. (Hereinbelow, the position of the button drive member 31 separated from the contact portion 20*b* is referred to as the "standby position.") By keeping the button drive member 31 at its standby position, the manipulation button 20L can be manipulated as a button which does not receive a reaction force from the actuator 30L. In addition, the manipulation button 20L can be surely moved to its maximally-pressed position without being influenced by the tolerance of the button drive member 31. In addition, in a state where the manipulation button 20L is at its maximally-pressed position, the button drive member 31 can be caused to hit the manipulation button 20L after the button drive member 31 is accelerated by the electric motor 32. As a result, the impact can be transmitted to the manipulation button 20L more easily, and this impact can provide the haptic sense to the user.

The manipulation button 20L is arranged on the front surface of the input device 100, and can be pushed backward. As illustrated in FIG. 5A and FIG. 5B, the button drive member 31 is arranged behind the manipulation button 20L. The button drive member 31 is a rod-like member, and is arranged such that its posture is inclined to both the forward/backward direction and the upward/downward direction. Specifically, in a front view of the manipulation button 20L, the button drive member 31 extends from the lower-end side of the manipulation button 20L to the upper-portion side where the rotation center line Ax1 is positioned. With this arrangement of the button drive member 31, for example as compared to a case that the button drive member 31 is parallel to the forward/backward direction or a case that the button drive member 31 is parallel to the upward/downward direction, a space required for arrangement of the button drive member 31 can be surely left more easily. The tip of the rod-like button drive member 31 hits the manipulation button 20L at the contact portion 20*b*.

The sliding direction of the button drive member 31 is not limited to that in the example of the input device 100. For example, the sliding direction of the button drive member 31 may be parallel to the tangent at a position off the middle position of the trajectory P1 of the contact portion 20*b*. That is, the sliding direction of the button drive member 31 may be parallel to the movement direction of the contact portion 20*b* accompanying a motion of the manipulation button 20L at a position that is defined between the initial position and the maximally-pressed position, and is different from the middle position. In addition, the shape of the button drive member 31 is also not limited to that in the example of the input device 100.

[Other Parts of Actuators] As illustrated in FIG. 5A, the actuator 30 has the transmission mechanism M3 that transmits motive power of the electric motor 32 to the button drive member 31. The transmission mechanism M3 includes a gear 33. The rotation center of the gear 33 is arranged to coincide with the leftward/rightward direction (a parallel direction to the rotation center line Ax1 of the manipulation button 20L). The gear 33 includes a large diameter gear 33*a*, and a small diameter gear 33*b* having a diameter smaller than that of the large diameter gear 33*a*. A rack 31*b* is formed on the button drive member 31, and the small diameter gear 33*b* functions as a pinion gear that engages with the rack 31*b*. In addition, a warm gear 32*a* is attached to the rotation axis of the electric motor 32. The warm gear 32*a* engages with the large diameter gear 33*a*.

In this manner, in the example of the input device 100, the warm gear 32*a*, the gear 33, and the rack 31*b* constitute the transmission mechanism M3. The rack 31*b* of the button drive member 31 and the small diameter gear 33*b* change a rotational force obtained from the electric motor 32 into a linear force. In addition, due to the presence of the warm gear 32*a*, a force to counteract a force to push the manipulation button 20L can be obtained more easily. That is, when the manipulation button 20L is pushed, rotation of the electric motor 32 due to the pushing force can be suppressed. In addition, the large diameter gear 33*a*, the small diameter gear 33*b*, and the warm gear 32*a* constitute a deceleration mechanism that decelerates rotation of the electric motor 32. The structure of the transmission mechanism M3 is not limited to that in the example of the input device 100. For example, the warm gear 32*a* attached to the electric motor 32 may engage with a gear of the button drive member 31 directly.

As illustrated in FIG. 5A, the electric motor 32 is positioned opposite to the manipulation button 20L, with the button drive member 31 and the transmission mechanism M3 (gear 33) being sandwiched between the electric motor 32 and the manipulation button 20L. In the example of the input device 100, the button drive member 31 is positioned behind the manipulation button 20L, and the gear 33 is positioned behind the button drive member 31. Then, the electric motor 32 is positioned behind the gear 33. Accordingly, in a front view of the input device 100 (when the input device 100 is seen in a direction in which the manipulation button 20L is pushed), the button drive member 31, the gear 33, and the electric motor 32 overlap the manipulation button 20L. With such arrangement, a space which is formed in the cabinet 2 of the input device 100, and is long in the forward/backward direction can be used effectively.

As illustrated in FIG. 5A, the electric motor 32 is arranged such that its rotation axis lies along a plane perpendicular to the rotation center line Ax1 of the manipulation button 20L. With this arrangement of the electric motor 32, the width of the actuator 30 in the leftward/rightward direction can be reduced, and it can be made easier to house the actuator 30 in the cabinet 2. The arrangement of the electric motor 32 is not limited to that in the example of the input device 100. The electric motor 32 may be arranged such that its rotation axis becomes parallel to the rotation center line Ax1 of the manipulation button 20L.

In the example of the input device 100, similarly to the button drive member 31, the rotation axis of the electric motor 32 is arranged obliquely such that it extends forward and downward. Then, when the actuator 30 is seen in the upward/downward direction, the rotation axis (warm gear 32*a*) of the electric motor 32 and part of the button drive member 31 overlap. More specifically, when the button drive member 31 has moved to a rearmost portion of its movable range, the rotation axis (warm gear 32*a*) of the electric motor 32, and part of the button drive member 31 overlap in a plan view of the actuator 30. With such arrangement of the electric motor 32, the width of the actuator 30 in the forward/backward direction can be reduced. The gear 33 constituting the transmission mechanism M3 is arranged between the rotation axis (warm gear 32*a*) of the electric motor 32 and the button drive member 31.

As illustrated in FIG. 3, the actuator 30 has a sensor 35 for sensing the position of the button drive member 31 (the rotation position of the electric motor 32). The sensor 35 is attached to a member positioned downstream of the rotation axis of the electric motor 32 in the route through which motive power of the electric motor 32 is transmitted. That is, the sensor 35 is attached to a member positioned downstream of the warm gear 32a attached to the rotation axis of the electric motor 32. In the example of the input device 100, the sensor 35 is attached to the rotation axis of the gear 33. The sensor 35 is, for example, a potentiometer that can sense the rotation position of the rotation axis of the gear 33 or an encoder that can sense rotation of the gear 33. The position of the sensor 35 is not limited to that in the example of the actuator 30. The actuator 30 may have a sensor attached to the button drive member 31 or may have a sensor attached to the rotation axis of the electric motor 32.

As mentioned above, the case 34 (see FIG. 2) is a member holding a plurality of members constituting the actuator 30 (i.e., the button drive member 31, the transmission mechanism M3, and the electric motor 32). The guides 34a (see FIG. 4) mentioned above that define the movement direction of the button drive member 31 are grooves formed on the inner surface of the case 34. Since with this structure, the button drive member 31 and the like can be handled as a single part at the time of the assembly of the input device 100, the assembly step can be made easier to perform.

In the example of the input device 100, the case 34 has a first case 34n and a second case 34m that are combined with each other in the leftward/rightward direction by fixing members (e.g., screws) (see FIG. 2). The cases 34m and 34n are formed of resin, for example. Grooves to function as the guides 34a are formed on the second case 34m and the first case 34n. As illustrated in FIG. 5A, the button drive member 31 has a plurality of projecting contact portions 31a on its left and right side surfaces. These contact portions 31a are arranged in the grooves, which are the guides 34a, and contact the inner surfaces of the grooves. Thereby, the area of contact between the button drive member 31 and the guides 34a becomes small, and smooth sliding movements of the button drive member 31 can be attained more easily.

The case 34 is fixed to the frame 11 arranged inside the cabinet 2 by fixing members such as screws, for example. The method for attachment of the case 34 is not limited to this. For example, the case 34 may be attached to the inner surface of the cabinet 2. In a still another example, the input device 100 may not have the case 34. In this case, a guide that defines the direction in which the button drive member 31 moves or a portion that holds the electric motor 32 may be formed on the frame 11, for example.

[Modification of Actuators] Note that the present disclosure is not limited to the examples of the actuators 30R and 30L explained above, but may be changed as appropriate.

Figure 6:
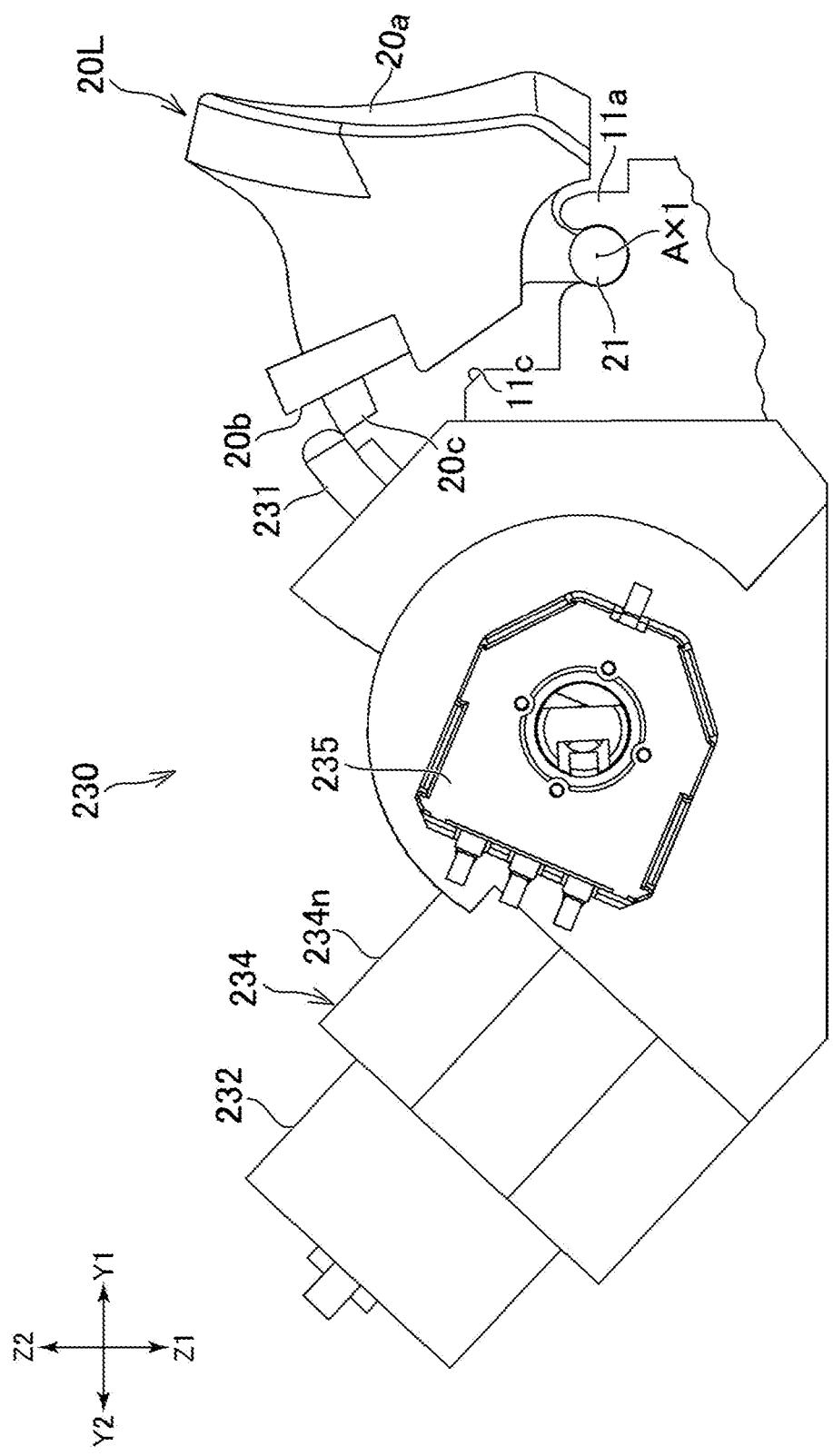
FIG. 6 is a side view illustrating a modification of the actuator.
Figure 7:
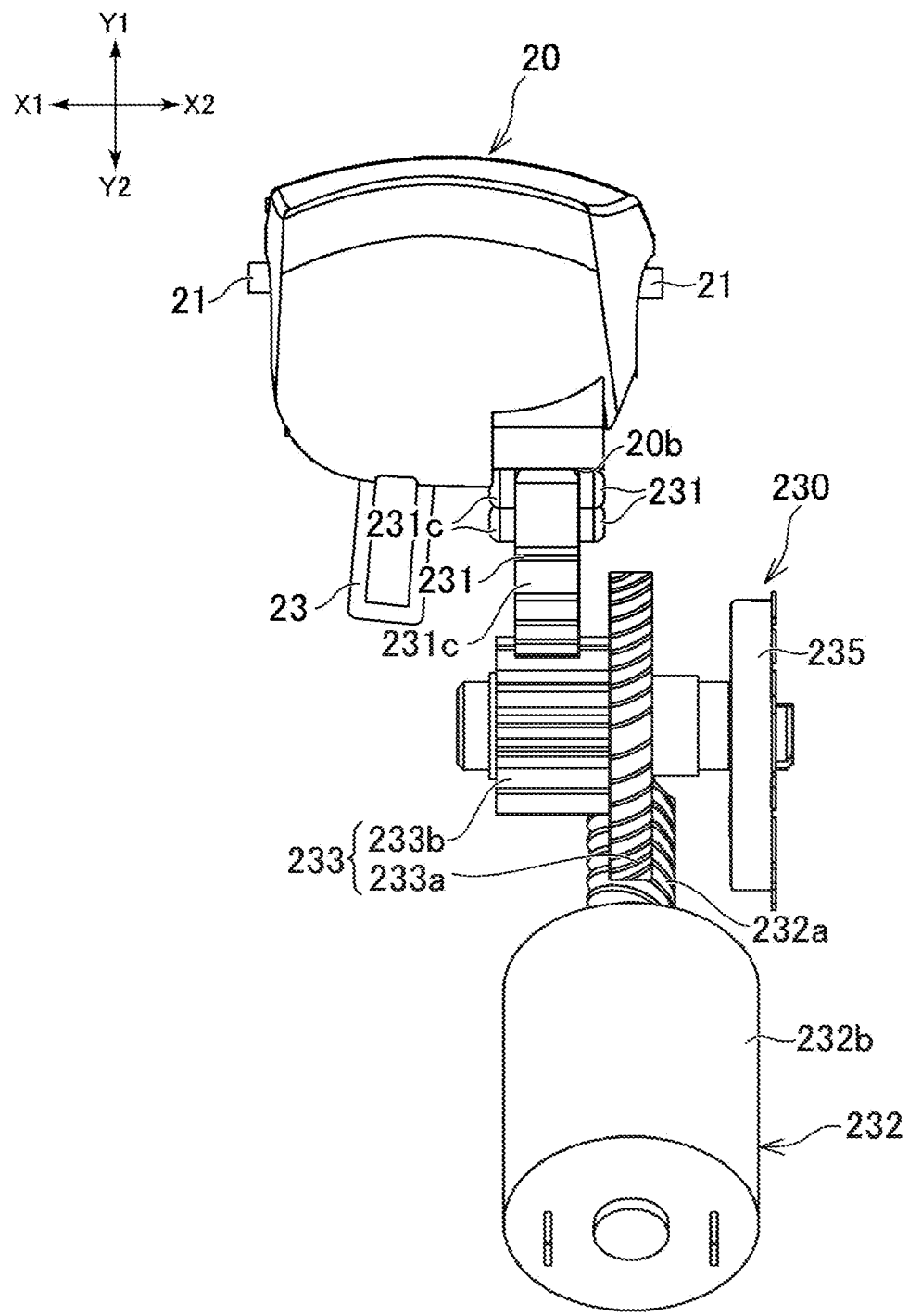
FIG. 7 is a bottom view of the actuator illustrated in FIG. 6. In this figure, a case of the actuator is removed, and its internal mechanism is illustrated.
Figure 8:
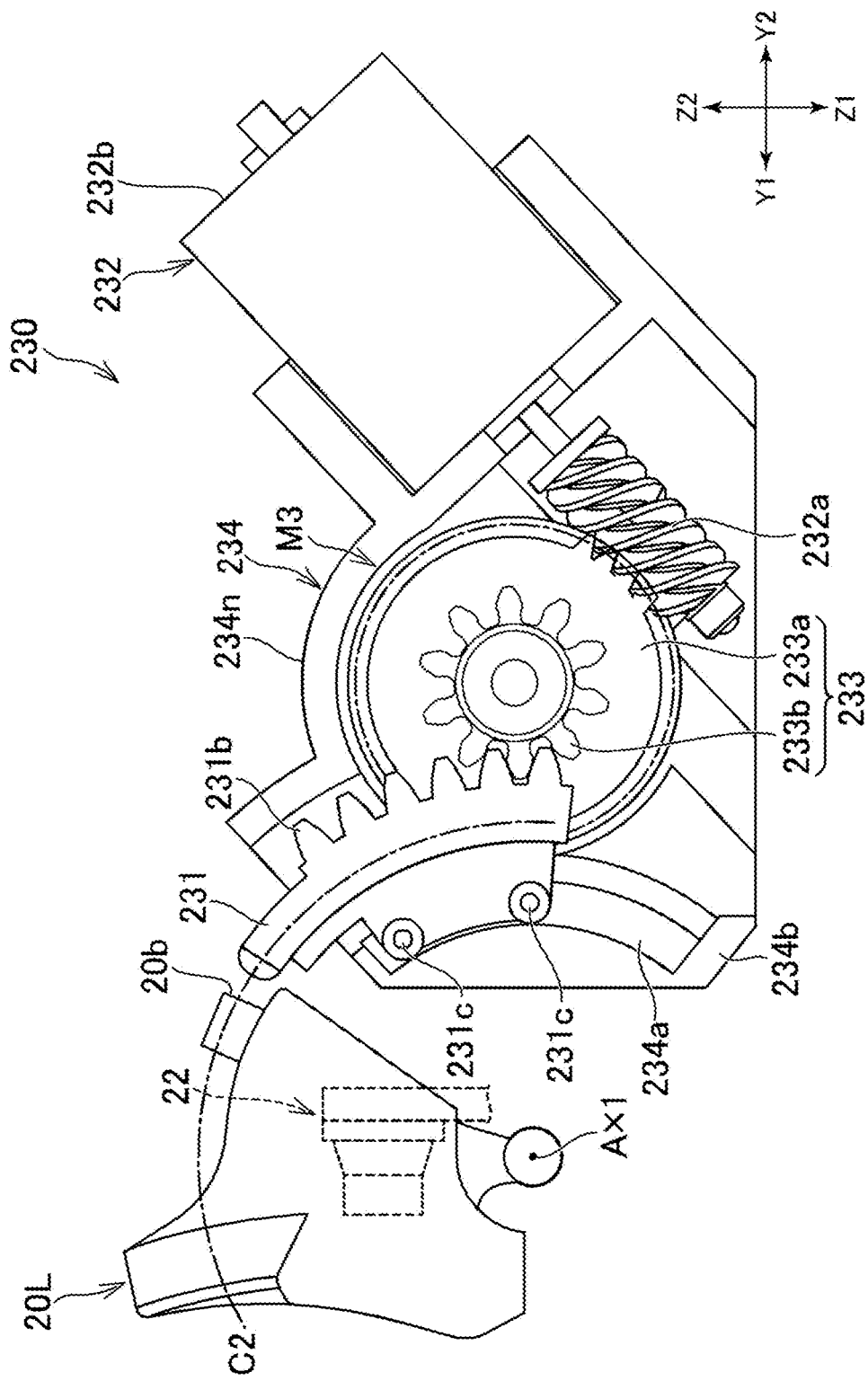
FIG. 8 is a figure illustrating the actuator as seen in the direction of the arrow VII in FIG. 7. In this figure, the inside of the case of the actuator is illustrated.

Hereinbelow, a modification (actuators 230) of the actuators is explained with reference to FIG. 6 to FIG. 8. FIG. 6 to FIG. 8 illustrate an actuator 230 which is one of the left and right actuators 230, and provided for the left manipulation button 20L. Since the left and right actuators 230 have structures that are symmetric about the center line C1 (FIG. 2) along the forward/backward direction or the left and right actuators 230 have the same structure, mainly the left actuator 230 is explained with reference to FIG. 6 to FIG. 8 hereinbelow.

As illustrated in FIG. 6, the actuator 230 has a button drive member 231 that contacts the contact portion 20b of the manipulation button 20L, and moves the manipulation button 20L. In addition, the actuator 230 has an electric motor 232 which is a driving source to move the button drive member 231, the transmission mechanism M3 that transmits motive power of the electric motor 232 to the button drive member 231, and a case 234 holding the electric motor 232, the transmission mechanism M3 and the button drive member 231.

The actuator 230 is mainly different from the actuators 30R and 30L in the sliding direction of the button drive member 231. Specifically, while the button drive members 31 of the actuators 30R and 30L are slidable linearly, the button drive member 231 of the actuator 230 is movable along an arc centered on the rotation center. Hereinbelow, mainly differences of the actuator 230 from the actuators 30R and 30L are explained. Matters regarding the actuator 230 that are not explained such as the arrangement of the actuator 230 in the input device 100 are similar to those in the actuator 30.

[Button Drive Members] Similarly to the button drive member 31, the button drive member 231 applies, to the manipulation button 20L, a force in an opposite direction to a direction in which the user pushes the manipulation button 20L, that is, a force in a direction to move the manipulation button 20L back to its initial position. When the manipulation button 20L is at its initial position, a gap may be provided between the button drive member 231 and the contact portion 20b of the manipulation button 20L, or the button drive member 231 and the contact portion 20b may be in contact with each other. As illustrated in FIG. 8, when the manipulation button 20L is seen in the direction of the rotation center line Ax1, the contact portion 20b is positioned opposite to the rotation center line Ax1, with the sensor 22 being sandwiched between the contact portion 20b and the rotation center line Ax1. In the example illustrated in FIG. 6 to FIG. 8, the manipulation button 20L has a projecting portion projecting downward from an edge (rear edge) of the lower-wall portion 20c, and the rear surface of the projecting portion functions as the contact portion 20b. The shape and position of the contact portion 20b are not limited to those illustrated in these figures.

As illustrated in FIG. 8, the actuator 230 has guides 234a that define the direction in which the button drive member 231 moves. The button drive member 231 is slidable along the guides 234a while staying in contact with the manipulation button 20L. Similarly to the guides 34a of the actuator 30, the guides 234a are formed on the case 234 holding the button drive member 231, the transmission mechanism M3 and the electric motor 232.

The position of the contact portion 20b moves about the rotation center line Ax1 accompanying a motion of the manipulation button 20L. That is, as illustrated in FIG. 8, the contact portion 20b moves along the arc-like trajectory P1 (see FIG. 5B) centered on the rotation center line Ax1. The guides 234a are formed such that the button drive member 231 slides along the arc. The center of the arc is positioned inside an arc C2 (see FIG. 8) including the trajectory P1. With this structure, sliding movements between the contact portion 20b of the manipulation button 20L and the tip of the button drive member 231 can be made small effectively. Here, the center positioned inside the arc C2 including the trajectory P1 of the contact portion 20b means a center positioned on the same side as the rotation center line Ax1 of the manipulation button 20L relative to the arc C2. In the example of the actuator 230, the button drive member 231 is slidable about a rotation center which coincides with the rotation center line Ax1 of the manipulation button 20L. That is, the button drive member 231 is slidable in the direction along the arc C2 including the trajectory P1 of the contact portion 20b. Accordingly, the button drive member 231 slides in the same direction as the direction in which the contact portion 20b moves.

The structures of button drive member 231 and the guides 234a are not limited to those in the example of the actuator 230. For example, the button drive member 231 may be slidable about a rotation center different from the rotation center line Ax1 of the manipulation button 20L. For example, the button drive member 231 may be slidable about a rotation center farther from the button drive member 231 than the rotation center line Ax1 or about a rotation center closer to the button drive member 231 than the rotation center line Ax1.

Similarly to the button drive member 31, the button drive member 231 has a movable range larger than the movable range of the manipulation button 20L. Specifically, the maximally-pressed position of the manipulation button 20L is defined by the stopper 11c (see FIG. 6) mentioned above. In a state where the manipulation button 20L is at its maximally-pressed position, the button drive member 231 is further slidable in the direction away from the contact portion 20b. That is, the button drive member 231 can be arranged at a standby position. By keeping the button drive member 231 at the standby position, the manipulation button 20L can be manipulated as a button which does not receive a reaction force from the actuator 230L. In addition, the manipulation button 20L can be surely moved to its maximally-pressed position without being influenced by the tolerance of the button drive member 231. Furthermore, in a state where the manipulation button 20L is at its maximally-pressed position, the button drive member 231 can be caused to hit the manipulation button 20L after the button drive member 231 is accelerated by the electric motor 232. As a result, the impact can be transmitted to the manipulation button 20L more easily, and this impact can provide the haptic sense to the user.

As illustrated in FIG. 8, the button drive member 231 is arranged behind the manipulation button 20L. In a front view of the manipulation button 20L, the button drive member 231 extends from the lower-end side of the manipulation button 20L to the upper-portion side where the rotation center line Ax1 is positioned.

As illustrated in FIG. 8, the button drive member 231 is a member that is curved like an arc. The button drive member 231 extends from the position of the contact portion 20b while being curved obliquely downward therefrom. Since with this arrangement of the button drive member 231, the length of the button drive member 231 in the forward/backward direction becomes short, a space required for arrangement of the button drive member 231 can be surely left more easily.

As illustrated in FIG. 8, the guides 234a are formed on the case 234. The guides 234a are grooves formed on the inner surface of the case 234, for example. In the example of the input device 100, similarly to the case 34, the case 234 has a first case 234n (see FIG. 8) and a second case that are combined with each other in the leftward/rightward direction by fixing members (e.g., screws). Grooves to function as the guides 234a are formed on the second case and the first case 234n. The button drive member 231 is slidable along the inner surfaces of the grooves. A stopper 234b (see FIG. 8) that defines one end of the movable range of the button drive member 231 may be formed at an end portion of the guides 234a.

As illustrated in FIG. 8, a plurality of projecting contact portions (guided portions) 231c are formed on the left and right side surfaces of the button drive member 231. The contact portions 231c are arranged in the grooves, which are the guides 234a, and are in contact with the inner surfaces of the grooves. The button drive member 231 is slidable in a state where the contact portion 231c is in contact with the inner surfaces of the grooves. Since with this structure, the area of contact between the button drive member 231 and the guides 234a becomes small, it is possible to make sliding movements of the button drive member 231 smooth.

[Other Parts of Actuators] As illustrated in FIG. 8, as mentioned above, the actuator 230 has the transmission mechanism M3 that transmits motive power of the electric motor 232 to the button drive member 231. The structure of the transmission mechanism M3 is similar to the structure of the transmission mechanisms M3 of the actuators 30R and 30L. That is, in the example of the actuator 230, the transmission mechanism M3 includes a gear 233. The rotation center of the gear 233 is arranged to coincide with the leftward/rightward direction (a parallel direction to the rotation center line Ax1 of the manipulation button 20L). The gear 233 includes a large diameter gear 233a, and a small diameter gear 233b having a diameter smaller than that of the large diameter gear 233a. A rack 231b is formed on the button drive member 231, and the small diameter gear 233b functions as a pinion gear that engages with the rack 231b. In addition, a warm gear 232a is attached to the rotation axis of the electric motor 232. The warm gear 232a engages with the large diameter gear 233a. The structure of the transmission mechanism M3 is not limited to that in the example of the actuator 230. For example, the warm gear 232a attached to the electric motor 232 may engage with a gear of the button drive member 231 directly.

As illustrated in FIG. 8, the electric motor 232 is positioned opposite to the manipulation button 20L, with the button drive member 231 and the transmission mechanism M3 (gear 233) being sandwiched between the electric motor 232 and the manipulation button 20L. Specifically, the button drive member 231 is positioned behind the manipulation button 20L, and the gear 233 is positioned behind the button drive member 231. Then, the electric motor 232 is positioned behind the gear 233. Accordingly, in a front view of the input device 100 (when the input device 100 is seen in a direction in which the manipulation button 20L is pushed), the button drive member 231, the gear 233, and the electric motor 232 overlap the manipulation button 20L. With such arrangement, a space which is formed in the cabinet 2, and is long in the forward/backward direction can be used effectively.

In addition, the electric motor 232 is arranged such that its rotation axis lies along a plane perpendicular to the rotation center line Ax1 of the manipulation button 20L. With this arrangement of the electric motor 232, the width of the actuator 230 in the leftward/rightward direction can be reduced. In the example of the input device 100, the rotation axis of the electric motor 232 is arranged obliquely such that it extends forward and upward. The body 232b of the electric motor 232 is arranged at a position lower than the rotation axis (warm gear 232a) unlike the electric motor 32. The gear 233 constituting the transmission mechanism M3 is arranged between the rotation axis of the electric motor 232 and the button drive member 231.

The actuator 230 has a sensor 235 for sensing the position of the button drive member 231 (i.e., the rotation position of the electric motor 232). Similarly to the sensors 35 of the actuators 30R and 30L, the sensor 235 is attached to the gear 233. Unlike the example of the actuator 230, the gear 233 may be attached to the button drive member 231 or may be attached to the electric motor 232.

SUMMARY

As explained above, in the example of the input device 100, the manipulation buttons 20R and 20L individually have the contact portions 20b on sides opposite to sides to be pushed by the user, and are movable about the rotation center lines Ax1. The actuators 30R, 30L, and 230 have the button drive members 31 and 231 that contact the contact portions 20b of the manipulation buttons 20L and 20R, and apply, to the manipulation buttons 20L and 20R, forces in opposite directions to directions in which the manipulation buttons 20L and 20R are pushed. In addition, the actuators 30R, 30L, and 230 have the guides 34a and 234a that define the directions in which the button drive members 31 and 231 move, and the button drive members 31 and 231 are slidable along the guides 34a and 234a. With this structure, sliding movements between the contact portions 20b and 20b of the manipulation buttons 20R and 20L and the tips of the button drive members 31 and 231 can be made small. As a result, it is possible to prevent wear of the contact portions 20b and 20b of the manipulation buttons 20L and 20R and the tips of the button drive members 31 and 231, and to realize smooth motions of the manipulation buttons 20L and 20R and the button drive members 31 and 231.

In addition, the actuator 230 has the button drive member 231 that contacts the contact portion 20b of the manipulation button 20L, and applies, to the manipulation button 20L, a force in an opposite direction to a direction in which the manipulation buttons 20L is pushed. The contact portion 20b moves along the arc-like trajectory P1 centered on the rotation center line Ax1, and the button drive member 231 is movable about a rotation center positioned inside the arc C2 including the trajectory P1. With this structure, too, sliding movements between the contact portion 20b of the manipulation button 20R and the tip of the button drive member 231 can be made small. As a result, it is possible to prevent wear of the contact portion 20b of the manipulation button 20R and the tip of the button drive member 231, and to realize smooth motions of the manipulation button 20R and the button drive member 231. Note that in the structure of the actuator 230, the button drive member 231 may not be slidable along the guides 234a. For example, the button drive member 231 may have an axis portion arranged coaxially with the rotation center line Ax1, and supported through this axis portion. With this structure, too, sliding movements between the contact portion 20b of the manipulation button 20R and the tip of the button drive member 231 can be made small.

Figure 9A:
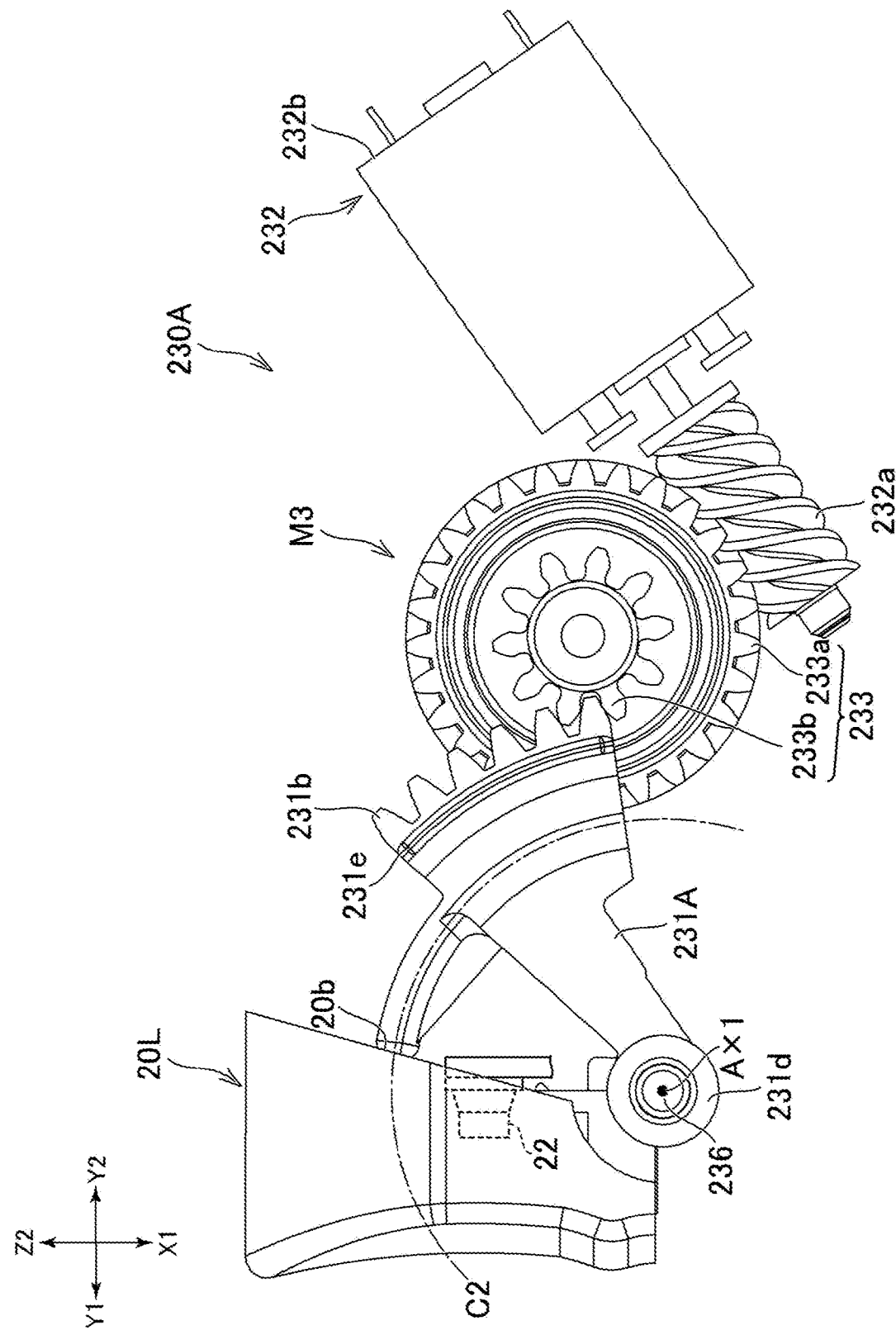
FIG. 9A is a figure illustrating still another modification of the actuator illustrated in FIG. 6.
Figure 9B:
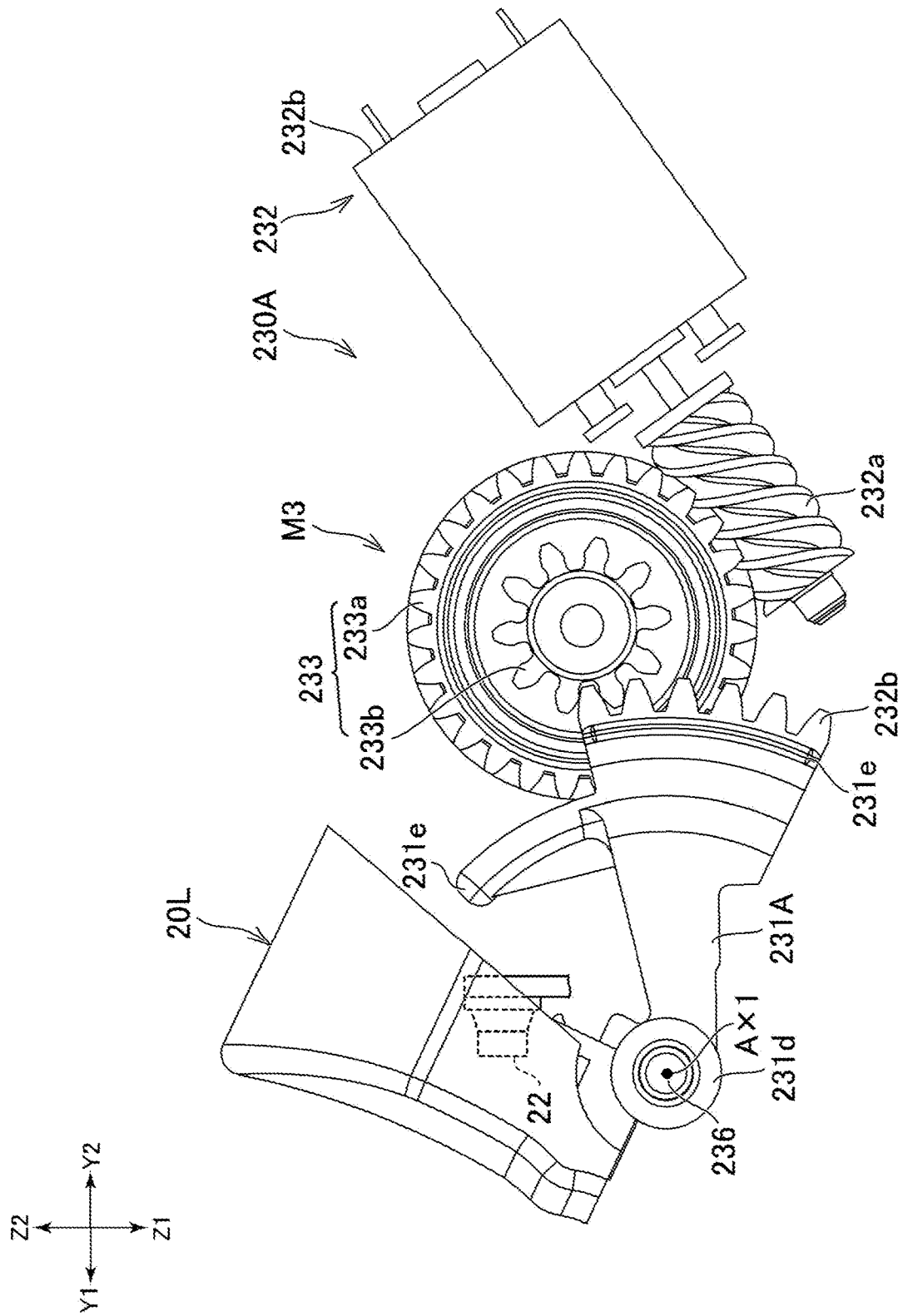
FIG. 9B is a figure illustrating still another modification of the actuator illustrated in FIG. 6. This figure illustrates how it looks when the manipulation button and the button drive member move in the actuator illustrated in FIG. 9A.
Figure 10:
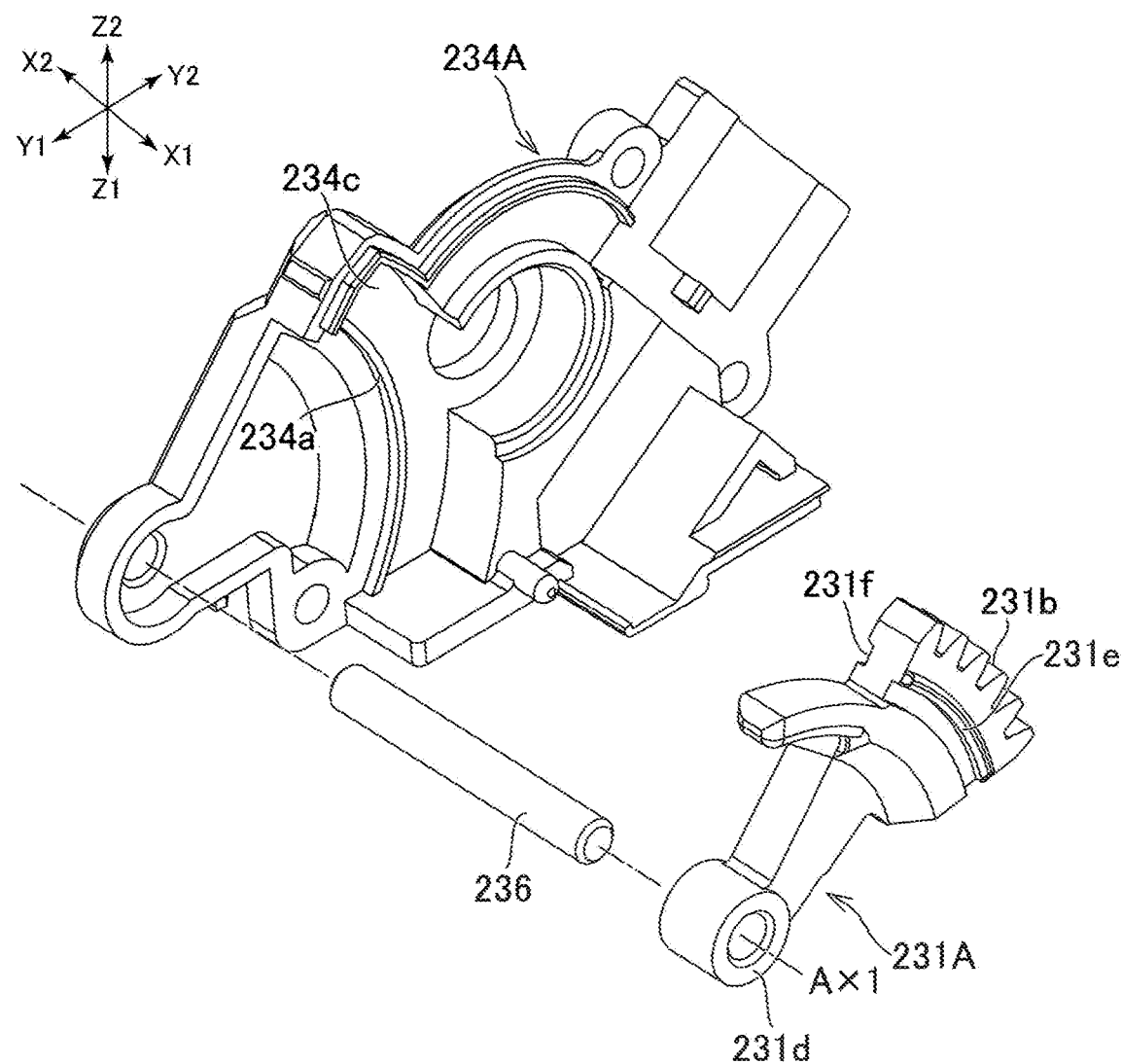
FIG. 10 is a perspective view of the button drive member illustrated in FIG. 9A and FIG. 9B, and a case housing the button drive member.

FIG. 9A and FIG. 9B disclose an actuator 230A having such an axis portion. In addition, FIG. 10 is a perspective view of the button drive member 231 illustrated in FIG. 9A and FIG. 9B, and a case 234A housing the button drive member 231. In these figures, members and parts which are the same as their corresponding members and parts in the actuators 30 and 230 explained thus far are given the same reference signs. Hereinbelow, mainly differences of the actuators 230A from the actuators 30 and 230 are explained. Matters that are not explained with respect to the actuator 230A may have the structures of their counterparts in the actuators 30 and 230.

As illustrated in FIG. 9A, in this actuator 230A, an axis portion 236 is arranged on the rotation center line Ax1, and the manipulation button 20L is rotatable about the axis portion 236. The axis portion 236 may be formed integrally with the manipulation button 20L, or may be formed separately from the manipulation button 20L. In the example illustrated in FIG. 10, the axis portion 236 is formed separately from the manipulation button 20L. Then, the axis portion 236 is fit to the supported portion 21 with an annular or hook-like shape formed on the manipulation button 20L. The manipulation button 20L is rotatable about the axis portion 236. The button drive member 231A has an annular supported portion 231d at its front end. The axis portion 236 is fit to the supported portion 231d, and the button drive member 231A is supported by the axis portion 236, and is rotatable about the rotation center line Ax1 of the manipulation button 20L. Unlike the example in FIG. 10, the axis portion 236 may be formed integrally with the supported portion 231d of the button drive member 231A.

As illustrated in FIG. 9A, the rack 231b is formed on the outer circumferential surface of the button drive member 231A. That is, the rack 231b is formed at the farthest position from the rotation center line Ax1. With this arrangement, the moment that is generated to the button drive member 231 by driving of the electric motor 232 increases; as a result, the force to act on the manipulation button 20L from the button drive member 231A can be increased.

In addition, as illustrated in FIG. 9A, the button drive member 231A is positioned behind the manipulation button 20L. Because of this, in a front view of the input device (when the input device is seen in a direction in which the manipulation button 20L is pushed), the button drive member 231A, the gear 233, the electric motor 232 and the electric motor 232 overlap the manipulation button 20L.

As mentioned above, the sensor 22 is arranged behind the manipulation button 20L. As illustrated in FIG. 9A, when the manipulation button 20L is seen in the direction of the rotation center line Ax1, the contact portion 20b is positioned opposite to the rotation center line Ax1, with the sensor 22 being sandwiched between the contact portion 20b and the rotation center line Ax1. With this arrangement, a sufficient distance can be surely left between the contact portion 20b and the rotation center line Ax1, and it is possible to make a force (i.e., a moment) that the button drive member 31 applies to the manipulation button 20L sufficiently large.

The button drive member 231A has, on its side surface, guided portions 231e and 231f (see FIG. 10) that are guided such that the button drive member 231A is movable about the rotation center line Ax1. As illustrated in FIG. 10, the guided portion 231e is, for example, a projecting portion extending along an arc centered on the rotation center line Ax1. On the other hand, the guided portion 231f is, for example, a groove extending along an arc centered on the rotation center line Ax1. The case 234A has two side walls 234c that are positioned opposite to each other with the button drive member 231A being sandwiched between the two side walls 234c in the direction along the rotation center line Ax1 (only one side wall 234c is illustrated in FIG. 10). A projecting portion to fit to the guided portion 231f is formed as a guide portion 234a on the side wall 234c of the case 234 at which the case 234 faces the side surface of the button drive member 231A on which the guided portion 231f is formed. A groove to which the guided portion 231e fits is formed as a guide portion on an opposite side wall, that is, the side wall of the case 234 at which the case 234 faces a side surface on which the guided portion 231e is formed. Note that, unlike the example of the button drive member 231A, both of the guided portions 231e and 231f formed on the two side surfaces may be grooves or may be projecting portions.

In this manner, the guided portions 231e and 231f are formed on the two side surfaces of the button drive member 231A, and the guide portions are formed on the two opposite side walls 234c of the case 234. That is, the button drive member 231A is supported by the two side walls 234c that are separated from each other, and opposite to each other in the direction along the rotation center line Ax1. With this arrangement, wobbling of the button drive member 231A can be suppressed effectively, and smooth motions of the button drive member 231A can be realized.

In FIG. 9B, the manipulation button 20L is arranged at its maximally-pressed position. The button drive member 231A has a movable range which is larger than the movable range of the manipulation button 20L, and the tip of the button drive member 231A can separate backward from the manipulation button 20L at the maximally-pressed position. That is, the button drive member 231A can be arranged at a standby position. By keeping the button drive member 231A, the manipulation button 20L can be used as a button which does not receive a reaction force. In addition, the manipulation button 20L can be surely moved to its maximally-pressed position without being influenced by the tolerances of the manipulation button 20L and the like. Furthermore, in a state where the manipulation button 20L is at its maximally-pressed position, the button drive member 231A can be caused to hit the manipulation button 20L after the button drive member 231A is accelerated by the electric motor 32. As a result, the impact can be transmitted to the manipulation button 20L more easily, and this impact can provide the haptic sense to the user.

Figure 11:
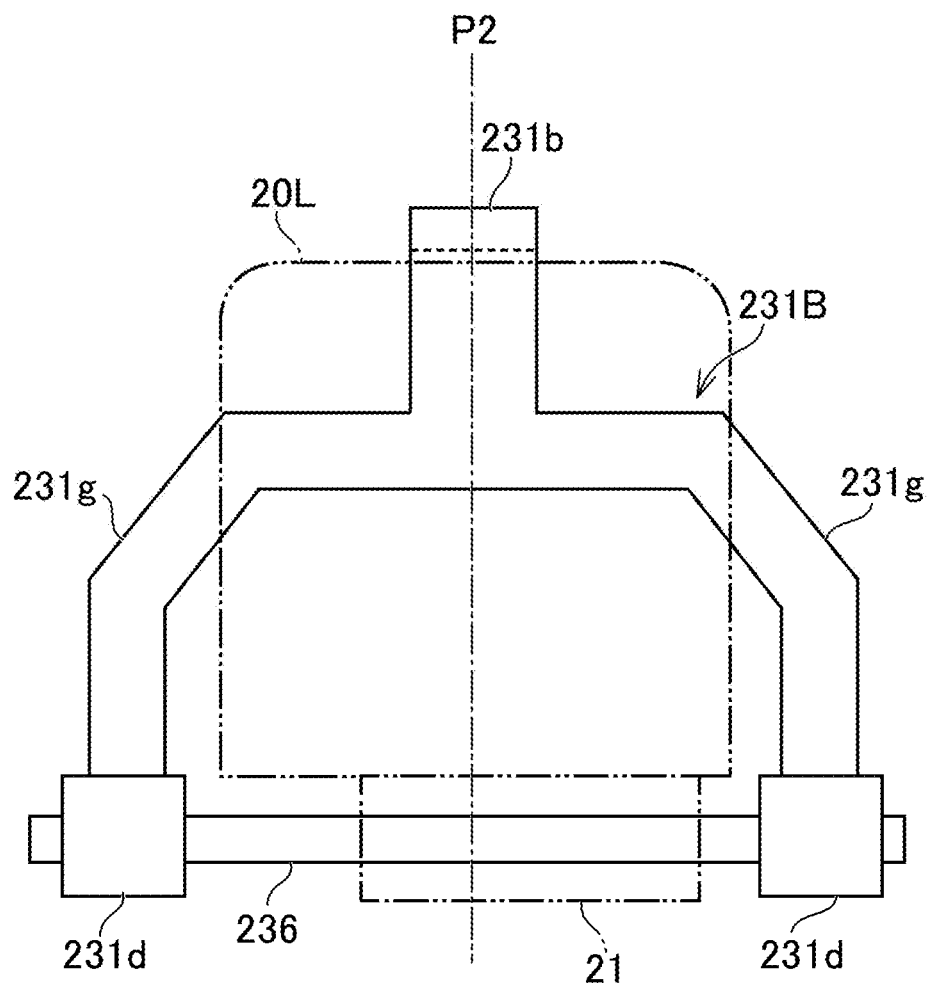
FIG. 11 is a figure illustrating a modification of the button drive member illustrated in FIG. 9A and FIG. 9B.

The support structure for the button drive member 231A is not limited to the structure illustrated in FIG. 10 and the like. FIG. 11 is a figure illustrating a modification of the support structure for the button drive member 231A. This figure illustrates how it looks when a button drive member 231B is seen from the lower side.

The button drive member 231B has two leg portions 231g extending from the portion where the rack 231b is formed toward the axis portion 236. The two leg portions 231g are separated from each other in the direction along the rotation center line Ax1. A supported portion 231d is formed at the tip of each leg portion 231g. Accordingly, the button drive member 231B is supported at two positions that are separated from each other in the direction along the rotation center line Ax1. With this arrangement, wobbling of the button drive member 231A can be suppressed effectively, and smooth motions of the button drive member 231A can be realized.

In the button drive member 231B, the two supported portions 231d are positioned opposite to each other with a plane P2 orthogonal to the rotation center line Ax1 being sandwiched between the two supported portions 231d. The plane P2 is a plane passing through the contact point of the manipulation button 20L and the button drive member 231B. Accordingly, the two supported portions 231d are positioned opposite to each other with the plane passing through the contact point of the manipulation button 20L and the button drive member 231B (a portion at which a force is applied to the manipulation button 20L) being sandwiched between the two supported portions 231d. With this positional relation between the two supported portions 231d and the contact point, the posture of the button drive member 231B at the time when the button drive member 231B pushes the manipulation button 20L can be stabilized. In addition, the plane P2 passes also through the position of the rack 231b. Accordingly, the two supported portions 231d are positioned opposite to each other with the plane passing through the rack 231b (a portion at which the torque of the electric motor 232 is received) being sandwiched between the two supported portions 231d. With this positional relation between the two supported portions 231d and the rack 231b, the posture of the button drive member 231B at the time when the button drive member 231B receives the torque of the electric motor 232 can be stabilized. The supported portion 21 of the manipulation button 20L (a portion to hold the axis portion 236) may be positioned between the two supported portions 231d.

With the structures of the actuators 30, 230, and 230A, advantages like the ones mentioned below are attained. As mentioned above, the actuators 30, 230, and 230A have the sensors 35 and 235 attached to the gears 33 and 233 constituting the transmission mechanisms M3. The sensors 35 and 235 are rotary encoders or potentiometers, for example. Control devices that control the actuators 30 and 230 (a control device provided to the input device 100 or a game machine) control the electric motors 32 and 232 on the basis of outputs of the sensors 35 and 235. In control of the actuators 30 and 230, data indicating the relations between the positions of the manipulation buttons 20L and 20R and outputs of the sensors 35 and 235 are necessary, and the data is obtained in calibration work for the sensors 35 and 235 performed at the time of manufacture of the input device 100. With the structures of the actuators 30, 230, and 230A mentioned above, motions of the actuators 30, 230, and 230A (specifically, displacement of the button drive members 31, 231, and 231A and rotation of the electric motors 32 and 232) are generally proportional displacement of the manipulation buttons 20L and 20R. As a result, the calibration work for the sensors 35 and 235 can be made easier to perform.

That is, an operator working on the calibration pushes the manipulation buttons 20L and 20R to move the actuators 30, 230, and 230A, and acquire outputs of the sensors 35 and 235 at a plurality of positions in the movable ranges of the manipulation buttons 20L and 20R. In the structures of the actuators 30, 230, and 230A mentioned above, motions of the actuators 30, 230, and 230A are generally proportional to displacement of the manipulation buttons 20L and 20R. Because of this, in the calibration work, acquisition of outputs of the sensors 35 and 235 at the positions at both ends (initial positions and maximally-pressed positions) of the movable ranges of the manipulation buttons 20L and 20R will suffice, for example. The relations between outputs of the sensors 35 and 233 and the positions of the manipulation buttons 20L and 20R between the initial positions and the maximally-pressed positions are obtained through calculation (the positions of the manipulation buttons 20L and 20R are obtained on the basis of outputs of the sensors 22 arranged behind them). In contrast to this, in structures in which relations between displacement of button drive members and displacement of the manipulation buttons 20L and 20R are not proportional relations, an operator needs to acquire outputs of the sensors 35 and 233 at many positions by changing the rotation positions of the manipulation buttons 20L and 20R little by little. Accordingly, with the structures the actuators 30, 230, and 230A mentioned above, it becomes possible to reduce the number of times of sensing outputs of the sensors 35 and 235, and the calibration work for the sensors 35 and 235 can be made easier to perform.

Embodiments of the present disclosure are not limited to the examples of the input device 100 mentioned above. For example, the button drive members 31 and 231 may be coupled with the manipulation buttons 20R and 20L. Also in this case, coupling portions of the manipulation buttons 20R and 20L are equivalent to contact portions that the button drive members contact.

The invention claimed is:

1. A manipulation input device, comprising:
   a manipulation button having a support rotatable about a rotation center line when a side of the manipulation button is pushed by a user in a push direction, and having a contact portion on an opposite side to the side pushed by the user;
   an actuator having a support rotatable about the rotation center line, and having a post that engages the contact portion and applies a force to the manipulation button in an opposite direction to the push direction, where the actuator is a separate part from the manipulation button, such that the post of the actuator engages the contact portion but is not integral with the manipulation button;
   a rack disposed on the actuator, which includes teeth located along an arc at a radial distance from the rotation center line, where the teeth and engaged by and receive controlled drive from a rotating drive gear, thereby controlling the rotation of the actuator about the rotation center line;
   a guide mechanism disposed within the housing and providing support and assistance in permitting the rack to slide within the housing and travel along the arc in rotation about the rotation center line,
   wherein the guide mechanism includes a first projection or first groove located on a surface of the housing facing a first side of the actuator, wherein the first projection or the first groove is elongate in an arc such that engagement of the actuator therewith provides the assistance in permitting the rack to slide within the housing and travel along the arc in rotation about the rotation center line.

2. The manipulation input device according to claim 1, wherein:
   the manipulation button is movable between a first position at which the user does not push the manipulation button, and a second position at which the user pushes the manipulation button in the push direction to a maximum position; and
   the rack is sized and positioned such that, upon further rotation of the actuator about the rotation center line in the push direction, the actuator may achieve a standby position at which the post may disengage from, and separate a predetermined distance from, the contact portion when the manipulation button is at the second position.

3. The manipulation input device according to claim 2, wherein, upon accelerated drive from the rotating drive gear, the actuator accelerates from the standby position through the predetermined distance, such that the post strikes the contact portion of the manipulation button under such acceleration, thereby providing haptic feedback to the user.

4. The manipulation input device according to claim 1, further comprising a housing supporting the actuator relative to the manipulation button, wherein the housing permits the rack to travel along the arc in rotation about the rotation center line in response to the controlled drive from the rotating drive gear.

5. The manipulation input device according to claim 4, wherein the housing includes an aperture through which the rotating drive gear enters the housing and engages the teeth of the rack.

6. The manipulation input device according to claim 1, wherein the guide mechanism includes the other of the first projection or the first groove located on the first side of the actuator, such that the first projection slidingly engages the first groove, thereby permitting the rack to slide within the housing and travel along the arc in rotation about the rotation center line.

7. The manipulation input device according to claim 6, wherein the guide mechanism includes:
   a second projection or second groove located on an opposite surface of the housing facing a second side of the actuator, opposite to the first side, wherein the second projection or the second groove is elongate in an arc; and
   the other of the second projection or the second groove located on the second side of the actuator, such that the second projection slidingly engages the second groove, thereby permitting the rack to slide within the housing and travel along the arc in rotation about the rotation center line.

8. The manipulation input device according to claim 1, further comprising a motor operating to cause the rotating drive gear to provide the controlled drive to the teeth of the rack.

9. The manipulation input device according to claim 8, wherein
   the motor includes a shaft having one of a sprocket gear or a worm gear;
   the rotating drive gear includes the other of the sprocket gear and the worm gear; and
   the rotating drive gear is included in a transmission mechanism that provides the controlled drive to the teeth of the rack.

* * * * *